United States Patent
Jiang

(10) Patent No.: US 11,133,913 B2
(45) Date of Patent: Sep. 28, 2021

(54) METHOD AND DEVICE FOR TURNING OFF AND TURNING ON PACKET DATA CONVERGENCE PROTOCOL PACKET REPLICATION FUNCTION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/608,696

(22) PCT Filed: Jun. 20, 2017

(86) PCT No.: PCT/CN2017/089190
§ 371 (c)(1),
(2) Date: Oct. 25, 2019

(87) PCT Pub. No.: WO2018/232593
PCT Pub. Date: Dec. 27, 2018

(65) Prior Publication Data
US 2020/0145171 A1    May 7, 2020

(51) Int. Cl.
*H04L 5/00* (2006.01)
*H04W 72/04* (2009.01)

(52) U.S. Cl.
CPC ......... *H04L 5/0098* (2013.01); *H04W 72/042* (2013.01); *H04W 72/0453* (2013.01)

(58) Field of Classification Search
USPC ........................................................ 370/329
See application file for complete search history.

(56) References Cited

U.S. PATENT DOCUMENTS

2003/0206534 A1* 11/2003 Wu .................. H04W 28/06
                                                      370/328
2017/0149546 A1*  5/2017 Zhang ................. H04L 5/0032
2018/0368132 A1* 12/2018 Babaei ................. H04W 80/02

FOREIGN PATENT DOCUMENTS

CN      102883380 A       1/2013
WO    WO 2014/111557 A1   7/2014

OTHER PUBLICATIONS

CATT, "Configuration and Activation/Deactivation of Duplication" 3GPP TSG-RAN Meeting #98 Hangzhou, China, May 15-19, 2017 (Year: 2017).*

(Continued)

*Primary Examiner* — Jamaal Henson
(74) *Attorney, Agent, or Firm* — Finnegan, Henderson, Farabow, Garrett & Dunner, L.L.P.

(57) ABSTRACT

Disclosed are a method and device for turning off and turning on a packet data convergence protocol (PDCP) packet replication function, a method and device for sending a media access control control element (MAC CE), a user equipment, a base station and a computer readable storage medium. The method for taming off a PDCP packet replication function comprises: receiving at least one MAC CE from a base station, the MAC CE carrying target carrier information; and turning off a PDCP packet replication function of a DRB or SRB that is mapped on a logical channel corresponding to a target carrier and the PDCP packet replication function of which is turned on according to the MAC CE. According to the embodiments of the present disclosure, a PDCP packet replication function of a DRB or SRB that is mapped on a logical channel corresponding to a target carrier and the PDCP packet replication function of which is turned on is turned off so as to solve the problem of a data packet on a logical channel corresponding (Continued)

RECEIVE AT LEAST ONE MEDIA ACCESS CONTROL CONTROL ELEMENT (MAC CE) FROM A BASE STATION — S101

TURN OFF A PACKET DATA CONVERGENCE PROTOCOL (PDCP) PACKET REPLICATION FUNCTION OF A DRS OR SRB THAT IS MAPPED ON A LOGICAL CHANNEL CORRESPONDING TO A TARGET CARRIER AND THE PDCP PACKET REPLICATION FUNCTION OF WHICH IS TURNED ON ACCORDING TO THE MAC CE — S102 to a deactivated target carrier not being able to be transmitted.

10 Claims, 12 Drawing Sheets

(56) References Cited

OTHER PUBLICATIONS

ZTE, "Consideration on the Activation/Deactivation of data Duplication for CA", 3GPP TSG-RAN WG2 Meeting #98 Hangzhou, China, May 15-19, 2017 (Year: 2017).*
3GPP TSG RAN meeting #76, "Status Report to TSG", West Palm Beach, USA, Jun. 5-8, 2017, 218 pgs.
Ericsson, "Packet duplication in CA", 3GPP TSG-RAN WG2 #98-AH, Tdoc R2-1707172, Qingdao, China, Jun. 27-29, 2017, 4 pages.
OPPO, "The impact of duplication on MAC", 3GPP TSG RAN WG2 #NR_AdHoc#2, R2-1706344, Qingdao, China, Jun. 27-29, 2017, 3 pages.
Supplementary European Search Report from the European Patent Office in corresponding European Application No. 17914978 dated Dec. 23, 2020.

* cited by examiner

METHOD AND DEVICE FOR TURNING OFF AND TURNING ON PACKET DATA CONVERGENCE PROTOCOL PACKET REPLICATION FUNCTION

CROSS REFERENCE TO RELATED APPLICATIONS

This application is a national phase application based on PCT/CN2017/089190, filed Jun. 20, 2017, the content of which is incorporated herein by reference.

TECHNICAL FIELD

The present disclosure relates to the technical field of communication, and in particular, to a method and apparatus for disabling and enabling a packet replication function of data packet convergence protocol, a method and apparatus for transmitting a medium access control control element, user equipment, a base station, and a computer-readable storage medium.

BACKGROUND

Currently, the 3rd Generation Partnership Project (3GPP) is carrying out standardization work on New Radio (NR) of 5th Generation mobile communication technology (5$^{th}$ Generation, 5G). In order to solve the reliability problem of transmission of data packet or signaling packet, 3GPP has passed a packet replication scheme at a Packet Data Convergence Protocol (PDCP) layer in user plane. However, since the PDCP layer is located at the uppermost layer of the radio user plane protocol stack, it cannot be guaranteed that the PDCP packet and the PDCP replication packet are transmitted through two carriers at the bottom layer, which brings the following problem: if a signal quality on one carrier is very poor and both the PDCP packet and the PDCP replication packet are transmitted on that carrier, the probability of transmission success is low. In order to solve the problem, a scheme of combination of the PDCP layer packet replication and the carrier is proposed in the relevant meetings, and by establishing a split bearer, that is, mapping one bearer to two or more Radio Link Control (RLC) entities below the PDCP layer, one PDCP layer can be mapped to different logical channels, so that the PDCP packet and the PDCP replication packet can be mapped to different physical carriers for transmission.

Then, in the 3GPP conference, a method of controlling the enabling and disabling of the PDCP packet replication function more rapidly by using a Medium Access Control (MAC) Control Element (CE for short) has been passed, and mapping two logical channels corresponding to the PDCP packet replication onto different carriers by a Radio Resource Control (RRC) layer has been passed.

However, after a carrier of the User Equipment (UE) is deactivated, if a logical channel of a data bearer (DRB) or a signaling bearer (SRB) for enabling the PDCP packet replication function is mapped on the carrier and a new carrier is not configured on the logical channel, a data packet on the logical channel cannot be transmitted.

SUMMARY

In view of the above, the present application discloses a method and an apparatus for disabling and enabling a PDCP packet replication function, a method and an apparatus for transmitting a MAC CE, a user equipment, a base station, and a computer-readable storage medium, so as to solve the problem that a data packet on a logical channel corresponding to a deactivated carrier cannot be transmitted.

According to a first aspect of an embodiment of the present disclosure, there is provided a method for disabling a packet replication function of a Packet Convergence Protocol (PDCP), the method including:

receiving at least one Media Access Control (MAC) Control Element (CE) transmitted by a base station, wherein the MAC CE carries target carrier information; and disabling the PDCP packet replication function of a Data Radio Bearing (DRB) or a Signaling Radio Bearing (SRB) which is mapped on a logical channel corresponding to a target carrier and enables the PDCP packet replication function according to the MAC CE.

According to a second aspect of the embodiments of the present disclosure, there is provided a method for enabling a PDCP packet replication function, including:

receiving a first MAC CE and one of a seventh MAC CE and an eighth MAC CE which are transmitted by a base station, wherein the first MAC CE is used for indicating UE to deactivate a target carrier, the seventh MAC CE is used for indicating the UE to enable the PDCP packet replication function of a DRB or an SRB mapped on the target carrier, and the eighth MAC CE is used for indicating the UE to map the logical channel corresponding to the target carrier to a new carrier in a deactivated state; and continuing to enable the PDCP packet replication function of all the DRBs or the SRBs which are mapped on the logical channel corresponding to the target carrier and enable the PDCP packet replication function.

According to a third aspect of the embodiments of the present disclosure, there is provided a method for disabling a PDCP packet replication function, including:

receiving a first MAC CE, or the first MAC CE and a second MAC CE, that are transmitted by a base station, wherein the first MAC CE is used for indicating LIE to deactivate a target carrier; a number of the second MAC CE is equal to a number of all DRBs or SRBs which are mapped on a logical channel corresponding to the target carrier and enable the PDCP packet replication function, and each second MAC CE is used for indicating to disable the PDCP packet replication function of one DRB or SRB;

disabling the PDCP packet replication function of all DRBs or SRBs Which are mapped on the logical channel corresponding to the target carrier and enable the PDCP packet replication function;

receiving a fifth MAC CE and one of a ninth MAC CE and a tenth MAC CE transmitted by the base station, wherein the fifth MAC CE is used for indicating the UE to activate the target carrier, the ninth MAC CE is used for indicating the UE to disable the PDCP packet replication function of the DRB or SRB mapped on the target carrier, and the tenth MAC CE is used for indicating the UE to map the logical channel corresponding to the target carrier to a new carrier in a deactivated state; and continuing to disable the PDCP packet replication function of all DRBs or SRBs which are mapped on the logical channel corresponding to the target carrier and enable the PDCP packet replication function.

According to a fourth aspect of the embodiments of the present disclosure, there is provided a method for transmitting MAC CE, including:

determining a target carrier to be deactivated; and transmitting at least one MAC CE to UE, wherein the MAC CE carries target carrier information so that the UE disables a PDCP packet replication function of a DRB or an SRB which is mapped on a logical channel corresponding to the target carrier and enables the PDCP packet replication function according to the at least one MAC CE.

According to a fifth aspect of the embodiments of the present disclosure, there is provided a method for transmitting an MAC CE, including:

determining a target carrier to be deactivated;

transmitting a first MAC CE and one of a seventh MAC CE and an eighth MAC CE to UE, wherein the first MAC CE is used for indicating the UE to deactivate a target carrier, the seventh MAC CE is used for indicating the UE to enable a PDCP packet replication function of a DRB or an SRB mapped on the target carrier, and the eighth MAC CE is used for indicating the UE to map a logical channel corresponding to the target carrier on a new carrier in an activated state, so that the UE continues to enable the PDCP packet replication function of all the DRBs or SRBs which are mapped on the logical channel corresponding to the target carrier and enable the PDCP packet replication function.

According to a sixth aspect of the embodiments of the present disclosure, there is provided a method for transmitting an MAC CE, including:

determining a target carrier to be deactivated;

transmitting a first MAC CE, or a first MAC CE and a second MAC CE, to UE, wherein the first MAC CE is used for indicating the UE to deactivate a target carrier, a number of the second MAC CE is equal to a number of all DRBs or SRBs which are mapped on a logical channel corresponding to the target carrier and enable a PDCP packet replication function, and each second MAC CE is used for indicating to disable the PDCP packet replication function of one DRB or SRB, so that the UE disables the PDCP packet replication function of all the DRBs or SRBs which are mapped on the logical channel corresponding to the target carrier and enable the PDCP packet replication function; and transmitting a fifth MAC CE and one of a ninth MAC CE and a tenth MAC CE to the UE, wherein the fifth MAC CE is used for indicating the UE to activate the target carrier, the ninth MAC CE is used for indicating the UE to disable the PDCP packet replication function of the DRB or the SRB mapped on the target carrier, and the tenth MAC CE is used for indicating the UE to map the logical channel corresponding to the target carrier to a new carrier in a deactivated state, so that the UE continues to disable the PDCP packet replication function of all the DRBs or the SRBs which are mapped on the logical channel corresponding to the target carrier and enable the PDCP packet replication function.

According to a seventh aspect of the embodiments of the present disclosure, there is provided a n apparatus for disabling a Data Packet Convergence Protocol (PDCP) packet replication function, including:

a first receiving module, configured to receive at least one Media Access Control (MAC) Control Element (CE) transmitted h a base station, wherein the MAC CE carries target carrier information; and a first disabling module, configured to disable the PDCP packet replication function of a Data Radio Bearing (DRB) or a Signaling Radio Bearing (SRB) which is mapped on a logical channel corresponding to a target carrier and enables the PDCP packet replication function according to the MAC CE received by the first receiving module.

According to an eighth aspect of the embodiments of the present disclosure, there is provided an apparatus for enabling a PDCP packet replication function, including:

a receiving module, configured to receive a first MAC CE and one of a seventh MAC CE and an eighth MAC CE which are transmitted by a base station, wherein the first MAC CE is used for indicating UE to deactivate a target carrier, the seventh MAC CE is used for indicating the UE to enable the PDCP packet replication function of a DRB or an SRB mapped on the target carrier, and the eighth MAC CE is used for indicating the UE to map the logical channel corresponding to the target carrier to a new carrier in a deactivated state; and an enabling module configured to, after the receiving module receives the first MAC CE and one of the seventh MAC CE and the eighth MAC CE transmitted by the base station, continue to enable the PDCP packet replication function of all the DRBs or the SRBs which are mapped on the logical channel corresponding to the target carrier and enable the PDCP packet replication function.

According to a ninth aspect of the embodiments of the present disclosure, there is provided an apparatus for disabling a PDCP packet replication function, including:

a first receiving module configured to receive a first MAC CE, or the first MAC CE and a second MAC CE, that are transmitted by a base station, wherein the first MAC CE is used for indicating UE to deactivate a target carrier; a number of the second MAC CE is equal to a number of all DRBs or SRBs which are mapped on a logical channel corresponding to the target carrier and enable the PDCP packet replication function, and each second MAC CE is used for indicating to disable the PDCP packet replication function of one DRB or SRB;

a first disabling module configured to disable the PDCP packet replication function of all DRBs or SRBs which are mapped on the logical channel corresponding to the target carriers and enable the PDCP packet replication function;

a second receiving module, configured to receive a fifth MAC CE and one of a ninth MAC CE and a tenth MAC CE transmitted by the base station, wherein the fifth MAC CE is used for indicating the UE to activate the target carrier, the ninth MAC CE is used for indicating the UE to disable the PDCP packet replication function of the DRB or SRB mapped on the target carrier, and the tenth MAC CE is used for indicating the UE to map the logical channel corresponding to the target carrier onto a new carrier in a deactivated state; and a maintaining module configured to, after the second receiving module receives the fifth MAC CE and one of the ninth MAC CE and the tenth MAC CE, continue to disable the PDCP packet replication function of all DRBs or SRBs which are mapped on the logical channel corresponding to the target carrier and enable the PDCP packet replication function.

According to a tenth aspect of the embodiments of the present disclosure, there is provided an apparatus for transmitting a MAC CE, including:

a determining module configured to determine a target carrier to be deactivated; and a first transmitting module configured to transmit at least one MAC CE to the UE, wherein the MAC CE carries target carrier information of the target carrier determined by the determining module, so that the UE disables a PDCP packet replication function of a DRB or an SRB which is mapped on a logical channel corresponding to the target carrier and enables the PDCP packet replication function according to the at least one MAC CE.

According to an eleventh aspect of the embodiments of the present disclosure, there is provided an apparatus for transmitting an MAC CE, including:

a determining module configured to determine a target carrier to be deactivated;

a transmitting module, configured to transmit a first MAC CE and one of a seventh MAC CE and an eighth MAC CE to UE, wherein the first MAC CE is used for indicating the UE to deactivate the target carrier determined by the determining module, the seventh MAC CE is used for indicating the UE to enable a PDCP packet replication function of a DRB or an SRB mapped on the target carrier, and the eighth MAC CE is used for indicating the UE to map a logical channel corresponding to the target carrier on a new carrier in an activated state, so that the UE continues to enable the PDCP packet replication function of all the DRBs or the SRBs which are mapped on the logical channel corresponding to the target carrier and enable the PDCP packet replication function.

According to a twelfth aspect of the embodiments of the present disclosure, there is provided an apparatus for transmitting an MAC CE, including:

a determining module configured to determine a target carrier to e deactivated;

a first transmitting module, configured to transmit a first MAC CE, or a first MAC CE and a second MAC CE, to UE, wherein the first MAC CE is used for indicating the UE to deactivate the target carrier determined by the determining module, a number of the second MAC CE is equal to a number of all DRBs or SRBs which are mapped on a logical channel corresponding to the target carrier and enable a PDCP packet replication function, and each second MAC CE is used for indicating to disable the PDCP packet replication function of one DRB or SRB, so that the UE disables the PDCP packet replication function of all the DRBs or the SRBs which are mapped on logical channel corresponding to the target carrier and enable the PDCP packet replication function; and a second transmitting module, configured to transmit a fifth MAC CE and one of a ninth MAC CE and a tenth MAC CE to the UE, wherein the fifth MAC CE is sued for indicating the UE to activate the target carrier, the ninth MAC CE is used for indicating the UE to disable the PDCP packet replication function of the DRB or the SRB mapped on the target carrier, and the tenth MAC CE is used for indicating the UE to map the logical channel corresponding to the target carrier to a new carrier in a deactivated state, so that the UE continues to disable the PDCP packet replication function of all the DRBs or the SRBs which are mapped on the logical channel corresponding to the target carrier and enable the PDCP packet replication function.

According to a thirteenth aspect of the embodiments of the present disclosure, there is provided a user equipment, including:

a processor; and a memory for storing instructions executable by the processor;

wherein the processor is configured to:

receive at least one Media Access Control (MAC) Control Element (CE) transmitted by a base station, wherein the MAC CE carries target carrier information; and disable the PDCP packet replication function of a Data Radio Bearing (DRB) or a Signaling Radio Bearing (SRB) which is mapped on a logical channel corresponding to a target carrier and enables the PDCP packet replication function according to the MAC CE According to a fourteenth aspect of the embodiments of the present disclosure, there is provided a user equipment, including:

a processor; and a memory for storing instructions executable by the processor;

wherein the processor is configured to:

receive a first MAC CE and one of a seventh MAC CE and an eighth MAC CE which are transmitted by a base station, wherein the first MAC CE is used for indicating UE to deactivate a target carrier, the seventh MAC CE is used for indicating the UE to enable the PDCP packet replication function of a DRB or an SRB mapped on the target carrier, and the eighth MAC CE is used for indicating the UE to map a logical channel corresponding to the target carrier to a new carrier in a deactivated state; and continue to enable the PDCP packet replication function of all the DRBs or the SRBs which are mapped on the logical channel corresponding to the target carrier and enable the PDCP packet replication function.

According to a fifteenth aspect of the embodiments of the present disclosure, there is provided a user equipment, including:

a processor; and a memory for storing instructions executable by the processor;

wherein the processor is configured to:

receive a first MAC CE, or the first MAC CE and a second MAC CE, that are transmitted by a base station, wherein the first MAC CE is used for indicating UE to deactivate a target carrier; a number of the second MAC CE is equal to a number of all DRBs or SRBs which are mapped on a logical channel corresponding to the target carrier and enable the PDCP packet replication function, and each second MAC CE is used for indicating to disable the PDCP packet replication function of one DRB or SRB;

disable the PDCP packet replication function of all DRBs or SRBs which are mapped on the logical channel corresponding to the target carrier and enable the PDCP packet replication function;

receive a fifth MAC CE and one of a ninth MAC CE and a tenth MAC CE transmitted by the base station, wherein the fifth MAC CE is used for indicating the UE to activate the target carrier, the ninth MAC CE is used for indicating the UE to disable the PDCP packet replication function of the DRB or SRB mapped on the target carrier, and the tenth MAC CE is used for indicating the UE to map the logical channel corresponding to the target carrier to a new carrier in a deactivated state; and continue to disable the PDCP packet replication function of all DRBs or SRBs which are mapped on the logical channel corresponding to the target carrier and enable the PDCP packet replication function.

According to a sixteenth aspect of the embodiments of the present disclosure, there is provided a base station, including:

a processor; and a memory for storing instructions executable by the processor;

wherein the processor is configured to:

determine a target carrier to be deactivated; and transmit at least one MAC CE to UE, wherein the MAC CE carries target carrier information so that the UE disables a PDCP packet replication function of a DRB or an SRB which is mapped on a logical channel corresponding to the target carrier and enables the PDCP packet replication function according to the at least one MAC CE.

According to a seventeenth aspect of the embodiments of the present disclosure, there is provided a base station, including:

a processor; and a memory for storing instructions executable by the processor;

wherein the processor is configured to:
determine a target carrier to be deactivated;
transmit a first MAC CE and one of a seventh MAC CE and an eighth MAC CE to UE, wherein the first MAC CE is used for indicating the UE to deactivate a target carrier, the seventh MAC CE is used for indicating the UE to enable a PDCP packet replication function of a DRB or an SRB mapped on the target carrier, and the eighth MAC CE is used for indicating the UE to map a logical channel corresponding to the target carrier on a new carrier in an activated state, so that the UE continues to enable the PDCP packet replication function of all the DRBs or SRBs which are mapped on the logical channel corresponding to the target carrier and enable the PDCP packet replication function.

According to an eighteenth aspect of the embodiments of the present disclosure, there is provided a base station, including:
a processor; and
a memory for storing instructions executable by the processor;
wherein the processor is configured to:
determine a target carrier to be deactivated;
transmit a first MAC CE, or a first MAC CE and a second MAC CE, to UE, wherein the first MAC CE is used for indicating the UE to deactivate a target carrier, a number of the second MAC CE is equal to a number of all DRBs or SRBs which are mapped on a logical channel corresponding to the target carrier and enable a PDCP packet replication function, and each second MAC CE is used for indicating to disable the PDCP packet replication function of one DRB or SRB, so that the UE disables the PDCP packet replication function of all the DRBs or SRBs which are mapped on the logical channel corresponding to the target carrier and enable the PDCP packet replication function; and
transmit a fifth MAC CE and one of a ninth MAC CE and a tenth MAC CE to the UE, wherein the fifth MAC CE is used for indicating the UE to activate the target carrier, the ninth MAC CE is used for indicating the UE to disable the PDCP packet replication function of the DRB or the SRB mapped on the target carrier, and the tenth MAC CE is used for indicating the UE to map the logical channel corresponding to the target carrier to a new carrier in a deactivated state, so that the UE continues to disable the PDCP packet replication function of all the DRBs or the SRBs which are mapped on the logical channel corresponding to the target carrier and enable the PDCP packet replication function.

The technical solutions provided by the embodiments of the present disclosure may include the following beneficial effects.

Through receiving at least one MAC CE transmitted by the base station, and disabling a PDCP packet replication function of a DRB or an SRB which is mapped on a logical channel corresponding to a target carrier and enables the PDCP packet replication function according to target carrier information carried in the MAC CE, the problem that a data packet on the logical channel corresponding to a deactivated target carrier cannot be sent is solved.

The PDCP packet replication function of the DRB or the SRB which is mapped on the logical channel corresponding to the target carrier and enables the PDCP packet replication function is disabled by various modes, and the implementation modes are flexible and various.

Through enabling the PDCP packet replication function of all the DRBs or the SRBs which are mapped on the logical channel corresponding to the target carrier and disable the PDCP packet replication function according to the received fifth MAC CE, the UE can enable the PDCP packet replication function mapped on the corresponding DRB or SRB after the target carrier is activated, and the data packet on the logical channel corresponding to the target carrier can be sent.

Through enabling the PDCP packet replication function of the target DRB or the target SRB according to the received sixth MAC CE, the PDCP packet and the PDCP replication packet can be transmitted through two logical channels.

Through receiving multiple types of MAC CEs, the PDCP packet replication function of the DRB or the SRB which is mapped on the logical channel corresponding to the target carrier and enables the PDCP packet replication function can be continuously enabled, and the implementation modes are flexible and various.

Through receiving multiple types of MAC CEs, the PDCP packet replication function of the DRB or the SRB which is mapped on the logical channel corresponding to the target carrier and enables the PDCP packet replication function can be continuously disabled, and the implementation mode is flexible.

Through sending at least one MAC CE to the UE, the UE can disable the PDCP packet replication function of the DRB or the SRB which is mapped on the logical channel corresponding to the target carrier and enables the PDCP packet replication function according to the at least one MAC CE, so that the problem that the data packet on the logical channel corresponding to the deactivated target carrier cannot be sent is solved.

Through transmitting the fifth MAC CE to the UE, the UE can enable the PDCP packet replication function of all the DRBs or the SRBs which are mapped on the logical channel corresponding to the target carrier and disable the PDCP packet replication function according to the fifth MAC CE, and then the UE can send the data packet on the logical channel corresponding to the target carrier.

Through transmitting the sixth MAC CE to the UE, the UE can enable the PDCP packet replication function of the target DRB or the target SRB according to the sixth MAC CE.

Through transmitting multiple types of MAC CEs to the UE, the UE can continuously enable the PDCP packet replication function of the DRB or the SRB which is mapped on the logical channel corresponding to the target carrier and enables the PDCP packet replication function, and the implementation modes are flexible and various.

Through transmitting multiple types of MAC CEs to the UE, the UE can continuously disable the PDCP packet replication function of all DRBs or SRBs which are mapped on the logical channel corresponding to the target carrier and enable the PDCP packet replication function, and the implementation mode is flexible.

It is to be understood that both the foregoing general description and the following detailed description are exemplary and explanatory only and are not restrictive of the present disclosure.

DETAILED DESCRIPTION

The technical solutions in the embodiments of the present application will be clearly and completely described below with reference to the drawings in the embodiments of the present application, and it is apparent that the described embodiments are only some embodiments of the present application, and not all embodiments. All other embodiments, Which can be derived by a person skilled in the art based on the embodiments in the present application without any inventive effort, are within the scope of protection of the present application.

Figure 1:
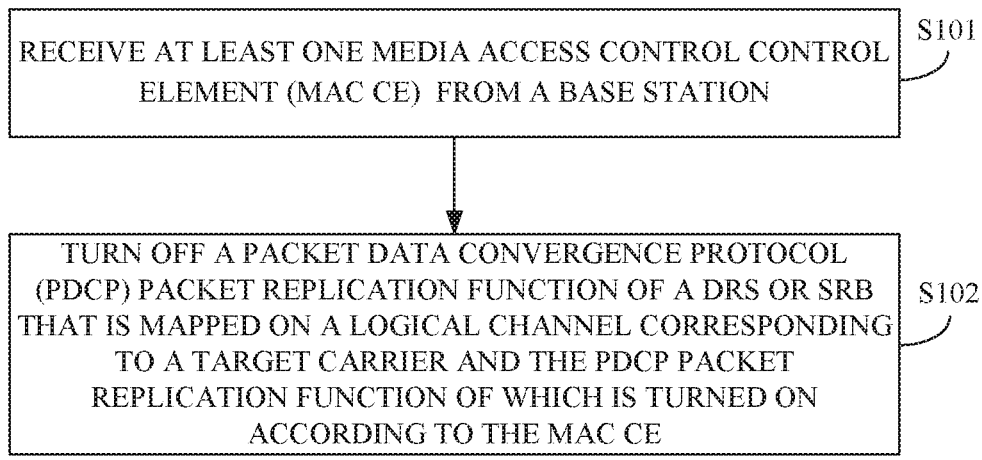
FIG. 1 is a flow chart illustrating a method for disabling a PDCP packet replication function according to an exemplary embodiment of the present application.

FIG. 1 is a flow chart illustrating a method for disabling a PDCP packet replication function according to an exemplary embodiment of the present application, which is described from the UE side. As shown in FIG. 1, the method for disabling the PDCP packet replication function includes the following steps.

In step S101, at least one MAC CE transmitted by the base station is received, the MAC CE carrying target carrier information.

In this embodiment, the UE receiving at least one MAC CE transmitted by the base station may include, but is not limited to: the UE may receive one MAC CE transmitted by the base station, for example, receive the first MAC CE transmitted by the base station. The UE may also receive two MAC CEs transmitted by the base station, for example, a first MAC CE and a second MAC CE transmitted by the base station. The UE may also receive three MAC CEs transmitted by the base station, for example, a first MAC CE, a third MAC CE, and a fourth MAC CE transmitted by the base station.

The first MAC CE is used for indicating the UE to deactivate the target carrier. The number of the second MAC CEs is equal to the number of all the DRBs or SRBs mapped on the logical channel corresponding to the target carrier and enabling the PDCP packet replication function, and each second MAC CE is used for indicating to disable the PDCP packet replication function of one DRB or SRB. The sum of the number of the third MAC CEs and the number of the fourth MAC CEs is equal to the number of all the DRBs or SRBs which are mapped on the logical channels corresponding to the target carrier and enable the PDCP packet replication function, each third MAC CE is used for indicating to disable the PDCP packet replication function of one DRB or SRB, and each fourth MAC CE is used for indicating the carrier mapped by the logical channel of one DRB or SRB to be updated by the target carrier to a new carrier in an activated state.

In step S102, the PDCP packet replication function of the DRB or SRB mapped to the logical channel corresponding to the target carrier and enabling the PDCP packet replication function is disabled according to the MAC CE.

If the UE receives the first MAC CE sent by the base station, then the PDCP packet replication function of all the DRBs or the SRBs mapped on the logical channel corresponding to the target carrier and enabling the PDCP packet replication function is disabled according to the first MAC CE.

If the UE receives the first MAC CE and the second MAC CE sent by the base station, the PDCP packet replication function of all the DRBs or the SRBs mapped on the logical channel corresponding to the target carrier and enabling the PDCP packet replication function may be disabled according to the first MAC CE and the second MAC CE.

Optionally, when the PDCP packet replication function of all the DRBs or SRBs mapped on the logical channel corresponding to the target carrier and enabling the PDCP packet replication function is disabled, an RLC entity corresponding to the target carrier may be determined, all SDUs and PDUs of the RLC entity to be transmitted are cleared, and a timer and a state variable corresponding to the RLC entity are reset. The state variable may include, but is not limited to, a state variable that maintains the positions of the lower and upper boundaries of the transmission window.

If the UE receives the first MAC CE, the third MAC CE, and the fourth MAC CE transmitted by the base station, the PDCP packet replication function of the DRB or SRB, which is mapped on the logical channel corresponding to the target carrier, enables the PDCP packet replication function, and has the same number as the third MAC CE, may be disabled according to the first MAC CE and the third MAC CE.

Assuming that the target carrier is a carrier 1, there are 10 DRBs for enabling the PDCP packet replication function corresponding to the carrier 1, and the UE receives 8 third MAC CEs and 2 fourth MAC CEs, then the UE disables the PDCP packet replication function of 8 DRBs, where the 8 disabled. DRBs correspond to DRBs carried in the 8 third MAC CEs.

Therefore, the embodiment can disable the PDCP packet replication function of the DRB or SRB mapped on the logical channel corresponding to the target carrier and enabling the PDCP packet replication function in various ways, and the implementation modes are flexible and various.

In the above embodiment, the problem that the data packet on the logical channel corresponding to the deactivated target carrier cannot be transmitted is solved by receiving at least one MAC CE sent by the base station, and disabling the PDCP packet replication function of the DRB or SRB mapped on the logical channel corresponding to the target carrier and enabling the PDCP packet replication function according to the target carrier information carried in the MAC CE.

Figure 2:
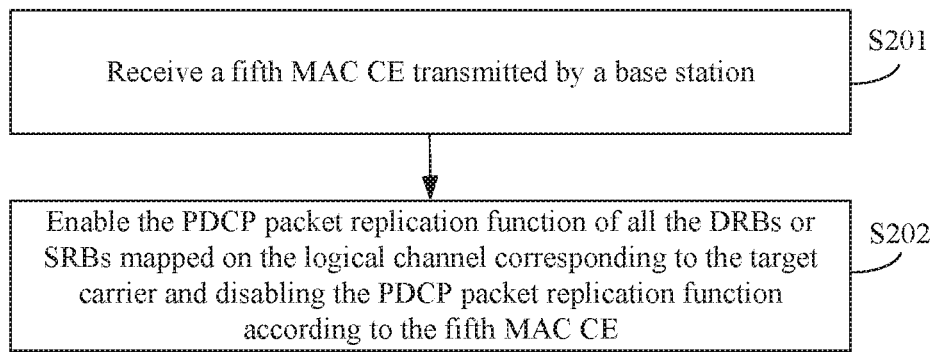
FIG. 2 is a flow chart illustrating another method for disabling a PDCP packet replication function according to an exemplary embodiment of the present application.

FIG. 2 is a flow chart illustrating another method for disabling a PDCP packet replication function according to an exemplary embodiment of the present application, and as shown in FIG. 2, after the above step S102, the method for disabling a PDCP packet replication function may further include the following steps.

In step S201, a fifth MAC CE transmitted by a base station is received, where the fifth MAC CE is used for indicating the UE to activate the target carrier.

After deactivating the target carrier, if the base station wants to activate the target carrier, a fifth MAC CE may be transmitted to the UE.

In step S202, according to the fifth MAC CE, the PDCP packet replication function of all the DRBs or SRBs mapped on the logical channel corresponding to the target carrier and disabling the PDCP packet replication function is enabled.

In the above embodiment, by enabling all PDCP packet replication function of the DRB or SRB mapped on the logical channel corresponding to the target carrier and disabling the PDCP packet replication function according to the received fifth MAC CE, the UE can enable the PDCP packet replication function mapped on the corresponding DRB or SRB after activating the target carrier, so that the data packet on the logical channel corresponding to the target carrier may be transmitted.

Figure 3A:
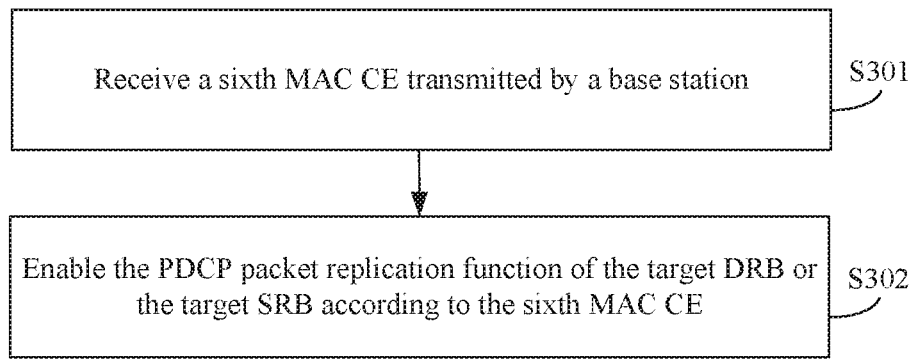
FIG. 3A is a flow chart illustrating another method for disabling a PDCP packet replication function according to an exemplary embodiment of the present application.

FIG. 3A is a flow chart illustrating another method for disabling a PDCP packet replication function according to an exemplary embodiment of the present application, and as shown in FIG. 3A, before the step S101, the method for disabling a PDCP packet replication function may further include the following steps.

In step S301, a sixth MAC CE transmitted by the base station is received, where the sixth MAC CE is used for indicating the UE to enable the PDCP packet replication function of the target DRB or target SRB.

In step S302, the PDCP packet replication function of the target DRB or the target SRB is enabled according to the sixth MAC CE.

In this embodiment, after the PDCP packet replication function of the target DRB or target SRB is enabled, the PDCP layer may replicate the PDCP packet and transmit it through the corresponding logical channel.

In the above-described embodiment, by enabling the PDCP packet replication function of the target DRB or the target SRB according to the received sixth MAC CE, the PDCP packet and the PDCP replication packet can be transmitted through two logical channels.

Figure 3B:
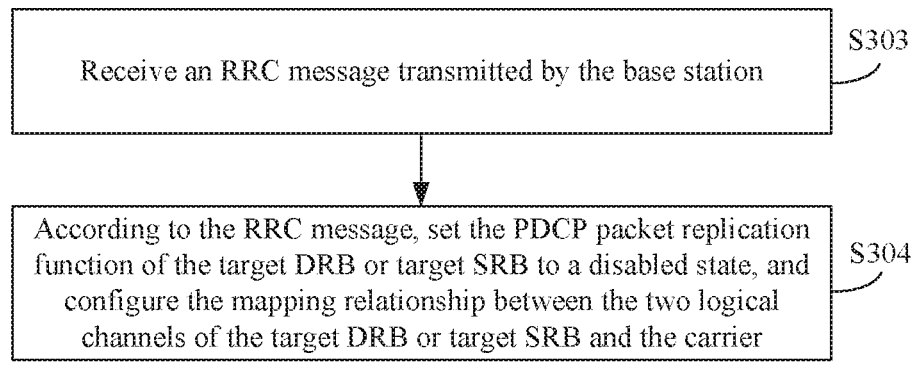
FIG. 3B is a flow chart illustrating another method for disabling a PDCP packet replication function according to an exemplary embodiment of the present application.

FIG. 3B is a flow chart illustrating another method for disabling a PDCP packet replication function according to an exemplary embodiment of the present application. As shown in FIG. 3B, before the step S301, the method for disabling the PDCP packet replication function may further include the following steps.

In step S303, an RRC message transmitted by the base station is received, where the RRC message carries configuration information, and the configuration information is used to configure a PDCP packet replication function of the target DRB or the target SRB, and carrier information mapped by two logical channels corresponding to the target DRB or the target SRB.

One logical channel may be used as a primary logical channel for transmitting and receiving the original PDCP packet, and the other logical channel may be used as a secondary logical channel for transmitting and receiving the replicated PDCP packet.

In step S304, according to the RRC message, the PDCP packet replication function of the target DRB or target SRB is set to a disabled state and the mapping relationship between the two logical channels of the target DRB or target SRB and the carrier is configured.

In the above embodiment, the PDCP packet replication function of the target DRB or the target SRB is set to the disabled state according to the received RRC message, and the mapping relationship between the two logical channels of the target DRB or the target SRB and the carrier is configured, so as to provide conditions for subsequently enabling the PDCP packet replication function of the target DRB or the target SRB.

Figure 4:
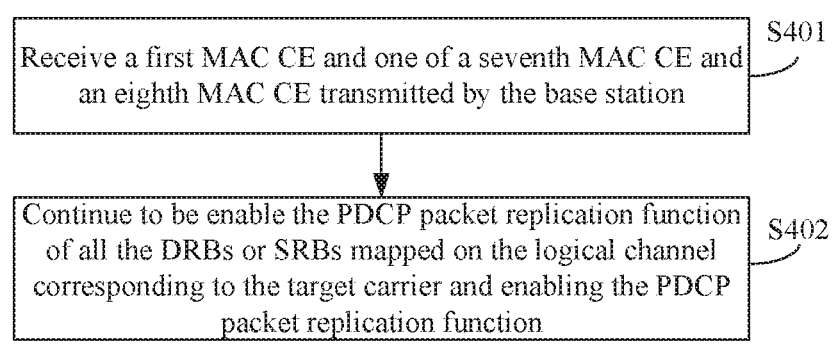
FIG. 4 is a flow chart illustrating a method for enabling a PDCP packet replication function according to an exemplary embodiment of the present application.

FIG. 4 is a flow chart illustrating a method for enabling a PDCP packet replication function according to an exemplary embodiment of the present application, which is described from the UE side, and as shown in FIG. 4, the method for enabling a PDCP packet replication function includes the following steps.

In step S401, the first MAC CE and one of the seventh and eighth MAC CEs transmitted by the base station are received.

The first MAC CE is configured for indicating the UE to deactivate the target carrier, the seventh MAC CE is configured for indicating the UE to enable a PDCP packet replication function of a DRB or an SRB mapped on the target carrier, and the eighth MAC CE is configured for indicating the UE to map a logical channel corresponding to the target carrier to a new carrier in an activated state.

The step S401 includes: receiving the first MAC CE and the seventh MAC CE transmitted by the base station, or receiving the first MAC CE and the eighth MAC CE transmitted by the base station.

In addition, the step S401 may further include: when receiving the first MAC CE and the eighth MAC CE sent by the base station, receiving a second MAC CE sent by the base station, where the number of the second MAC CEs is equal to the number of DRBs or SRBs which are mapped on the logical channel corresponding to the target carrier and enable the PDCP packet replication function, and each second MAC CE is used for indicating to disable the PDCP packet replication function of one DRB or SRB.

In step S402, the PDCP packet replication function of all the DRBs or SRBs mapped on the logical channel corresponding to the target carrier and enabling the PDCP packet replication function is continued to be enabled.

In this embodiment, if a seventh MAC CE that enables the PDCP packet replication function of the DRB or SRB mapped on the target carrier or an eighth MAC CE that maps the logical channel corresponding to the target carrier to the new carrier in an activated state is received while the first MAC CE that deactivates the target carrier is received, the PDCP packet replication function of all the DRBs or SRBs mapped on the logical channel corresponding to the target carrier and enabling the PDCP packet replication function may be continuously enabled. If the eighth MAC CE for mapping the logical channel corresponding to the target carrier onto the new carrier in the activated state is received when the first MAC CE and the second MAC CE for deactivating the target carrier are received, the PDCP packet replication function of all the DRBs or the SRBs mapped on the logical channel corresponding to the target carrier and enabling the PDCP packet replication function may be continuously enabled.

In the above embodiment, by receiving multiple types of MAC CEs, the PDCP packet replication function of the DRB or the SRB mapped on the logical channel corresponding to the target carrier and enabling the PDCP packet replication function can be continuously enabled, and the implementation manner is flexible and diverse.

Figure 5:
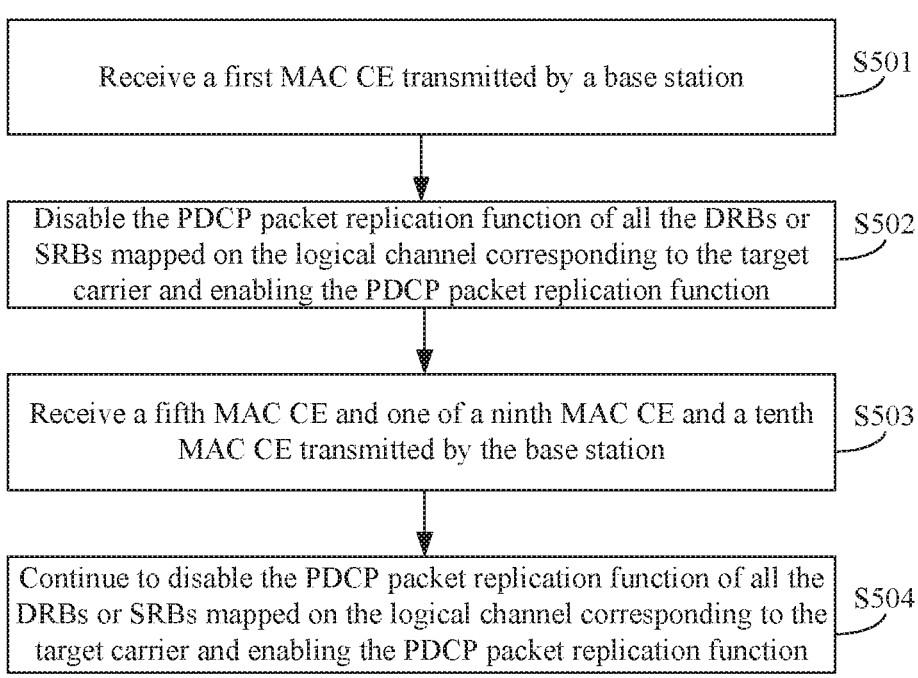
FIG. 5 is a flow chart illustrating yet another method for disabling a PDCP packet replication function according to an exemplary embodiment of the present application.

FIG. 5 is a flow chart illustrating another method for disabling a PDCP packet replication function according to an exemplary embodiment of the present application, which is described from the UE side, and as shown in FIG. 5, the method for disabling a PDCP packet replication function includes the following steps.

In step S501, a first MAC CE, or a first MAC CE and a second MAC CE, transmitted by a base station is received.

The first MAC CE is used for indicating the UE to deactivate the target carrier; the number of the second MAC CEs is equal to the number of all the DRBs or SRBs mapped on the logical channel corresponding to the target carrier and enabling the PDCP packet replication function, and each second MAC CE is used for instructing to disable the PDCP packet replication function of one DRB or SRB.

In step S502, the PDCP packet replication function of all the DRBs or SRBs mapped on the logical channel corresponding to the target carrier and enabling the PDCP packet replication function is disabled.

In step S503, a fifth MAC CE and one of a ninth MAC CE and a tenth MAC CE transmitted by the base station are received.

The fifth MAC CE is configured for indicating the UE to activate the target carder, the ninth MAC CE is configured for indicating the UE to disable the PDCP packet replication function of the DRB or the SRB mapped on the target carrier, and the tenth MAC CE is configured for indicating the UE to map a logical channel corresponding to the target carrier to a new carrier in a deactivated state.

In step S504, the PDCP packet replication function of all the DRBs or SRBs mapped on the logical channel corresponding to the target carrier and enabling the PDCP packet replication function is continuously disabled.

In this embodiment, after the PDCP packet replication function of all the DRBs or SRBs mapped on the logical channel corresponding to the target carrier and enabling the PDCP packet replication function are disabled, if a fifth MAC CE for activating the target carrier is received, and a ninth MAC CE for disabling the PDCP packet replication function of the DRB or SRB mapped on the target carrier or the tenth MAC CE mapping the logical channel corresponding to the target carrier to a new carrier in a deactivated state is received, the PDCP packet replication function of all the DRBs or SRBs mapped on the logical channel corresponding to the target carrier and enabling the PDCP packet replication function may be continuously disabled.

In the above embodiment, by receiving multiple types of MAC CEs, the PDCP packet replication function of all the DRBs or the SRBs mapped on the logical channel corresponding to the target carrier and enabling the PDCP packet replication function may be continuously disabled, and the implementation manner is flexible.

Figure 6A:
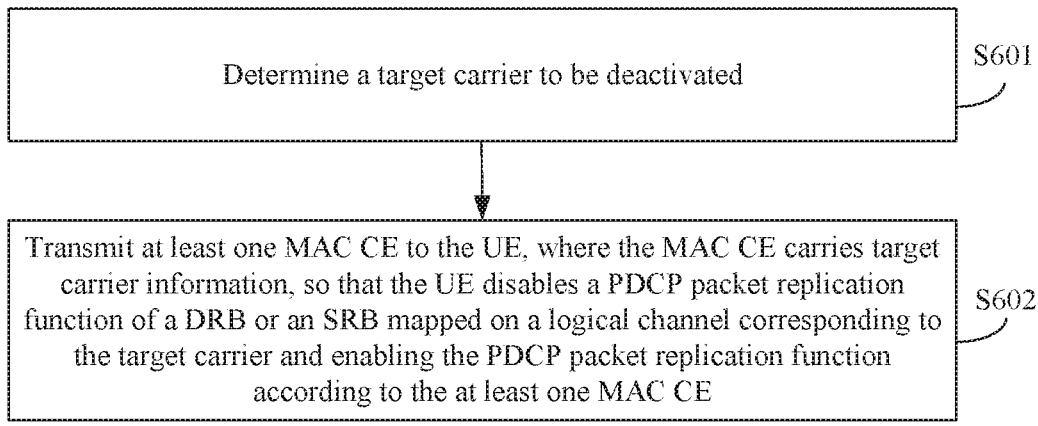
FIG. 6A is a flow chart illustrating a method for transmitting a MAC CE according to an exemplary embodiment of the present application.

FIG. 6A is a flow chart of a method for transmitting a MAC CE according to an exemplary embodiment of the present application, which is described from a base station side. As shown in FIG. 6A, the method for transmitting a MAC CE includes the following steps.

In step S601, a target carrier to be deactivated is determined.

In step S602, at least one MAC CE is transmitted to the UE, where the MAC CE carries target carrier information, so that the UE disables a PDCP packet replication function of a DRB or an SRB mapped on a logical channel corresponding to the target carrier and enabling the PDCP packet replication function according to the at least one MAC CE.

In this embodiment, the base station transmitting at least one MAC CE to the UE may include, but is not limited to: the base station transmits two MAC CEs to the UE, for example, the base station transmits a first MAC CE and a second MAC CE to the UE. The base station transmits three MAC CEs to the UE, for example, the base station transmits a first MAC CE to the UE, and transmits a third MAC CE and a fourth MAC CE to the UE.

The first MAC CE is used for instructing the UE to deactivate the target carrier, the number of the second MAC CEs is equal to the number of all DRBs or SRBs which are mapped on the logical channel corresponding to the target carrier and enable the PDCP packet replication function, and each of the second MAC CEs is used for instructing to disable the PDCP packet replication function of one DRB or SRB. The sum of the number of the third MAC CEs and the number of the fourth MAC CEs is equal to the number of all the DRBs or SRBs which are mapped on the logical channels corresponding to the target carrier and enable the PDCP packet replication function, each third MAC CE is used for indicating to disable the PDCP packet replication function of one DRB or SRB, and each fourth MAC CE is used for indicating the carrier mapped by the logical channel of one DRB or SRB to be updated by the target carrier to a new carrier in an activated state.

In the above embodiment, by sending at least one MAC CE to the UE, the UE may disable the PDCP packet replication function of the DRB or the SRB mapped on the logical channel corresponding to the target carrier and enabling the PDCP packet replication function according to the at least one MAC CE, so as to solve the problem that the data packet on the logical channel corresponding to the deactivated target carrier cannot be sent.

Figure 6B:
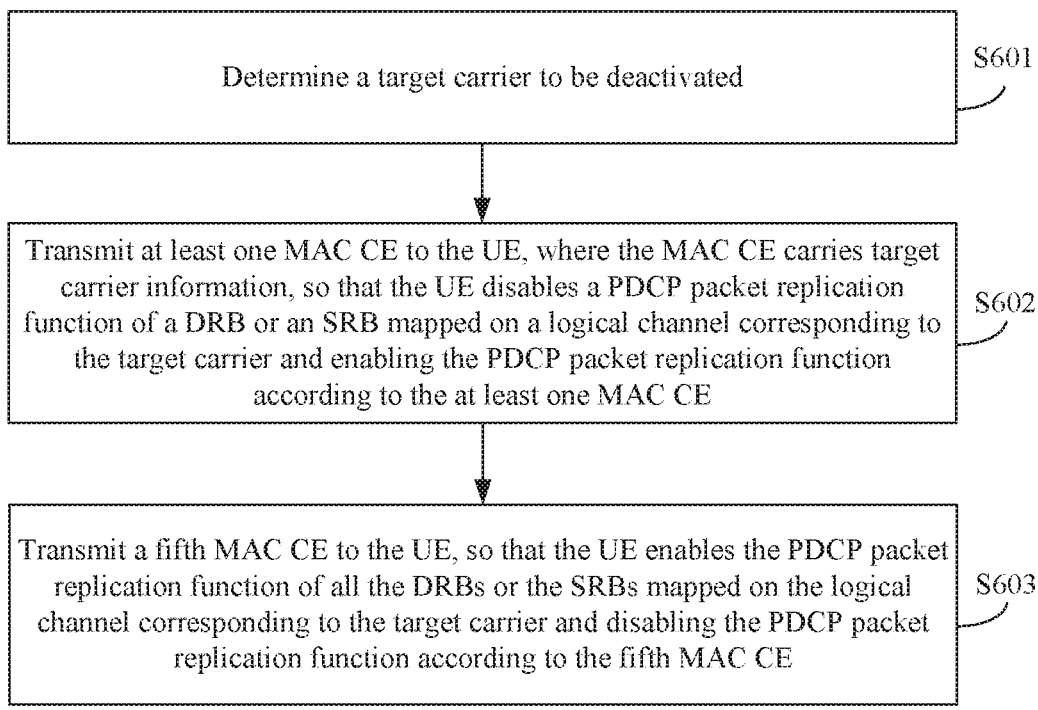
FIG. 6B is a flow chart illustrating another method for transmitting a MAC CE according to an exemplary embodiment of the present application.

FIG. 6B is a flow chart of another method for transmitting a MAC CE according to an exemplary embodiment of the present application, which is described from the base station side. As shown in FIG. 6B, after the step S602, the method for transmitting a MAC CE may further include the following steps.

In step S603, a fifth MAC CE is sent to the UE, so that the UE enables the PDCP packet replication function of all the DRBs or the SRBs mapped on the logical channel corresponding to the target carrier and disabling the PDCP packet replication function according to the fifth MAC CE.

The fifth MAC CE is used for indicating the UE to activate the target carrier.

In the above embodiment, by sending the fifth MAC CE to the UE, the UE may enable the PDCP packet replication function of all the DRBs or the SRBs mapped on the logical channel corresponding to the target carrier and disabling the PDCP packet replication function according to the fifth MAC CE, so that the UE can send the data packet on the logical channel corresponding to the target carrier.

Figure 6C:
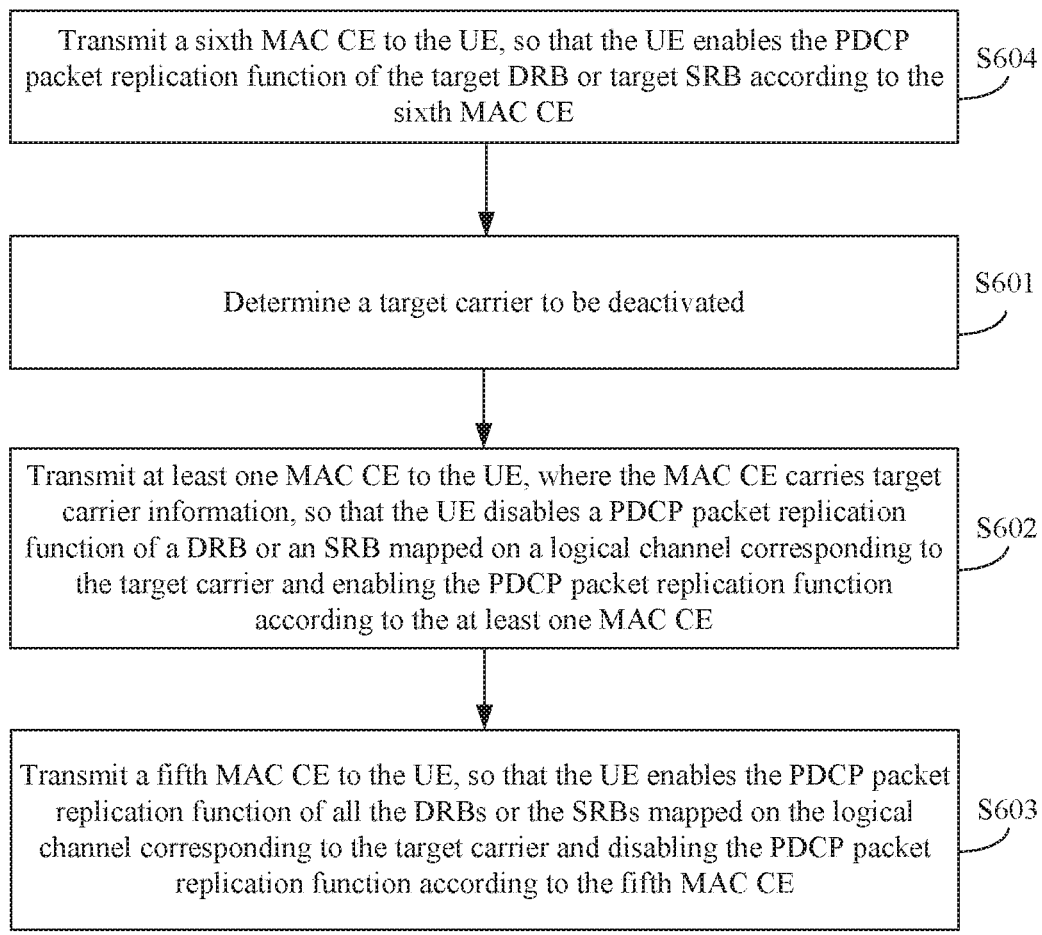
FIG. 6C is a flow chart illustrating another method for transmitting a MAC CE according to an exemplary embodiment of the present application.

FIG. 6C is a flow chart of another method for transmitting a MAC CE according to an exemplary embodiment of the present application, which is described from the base station side. As shown in FIG. 6C, before the step S601, the method for transmitting a MAC CE may further include the following steps.

In step S604, a sixth MAC CE is transmitted to the UE for the UE to enable the PDCP packet replication function of the target DRB or target SRB according to the sixth MAC CE.

The sixth MAC CE is configured for indicating the UE to enable the PDCP packet replication function of the target DRB or the target SRB.

In the above embodiment, by sending the sixth MAC CE to the UE, the UE may enable the PDCP packet replication function of the target DRB or the target SRB according to the sixth MAC CE.

Figure 6D:
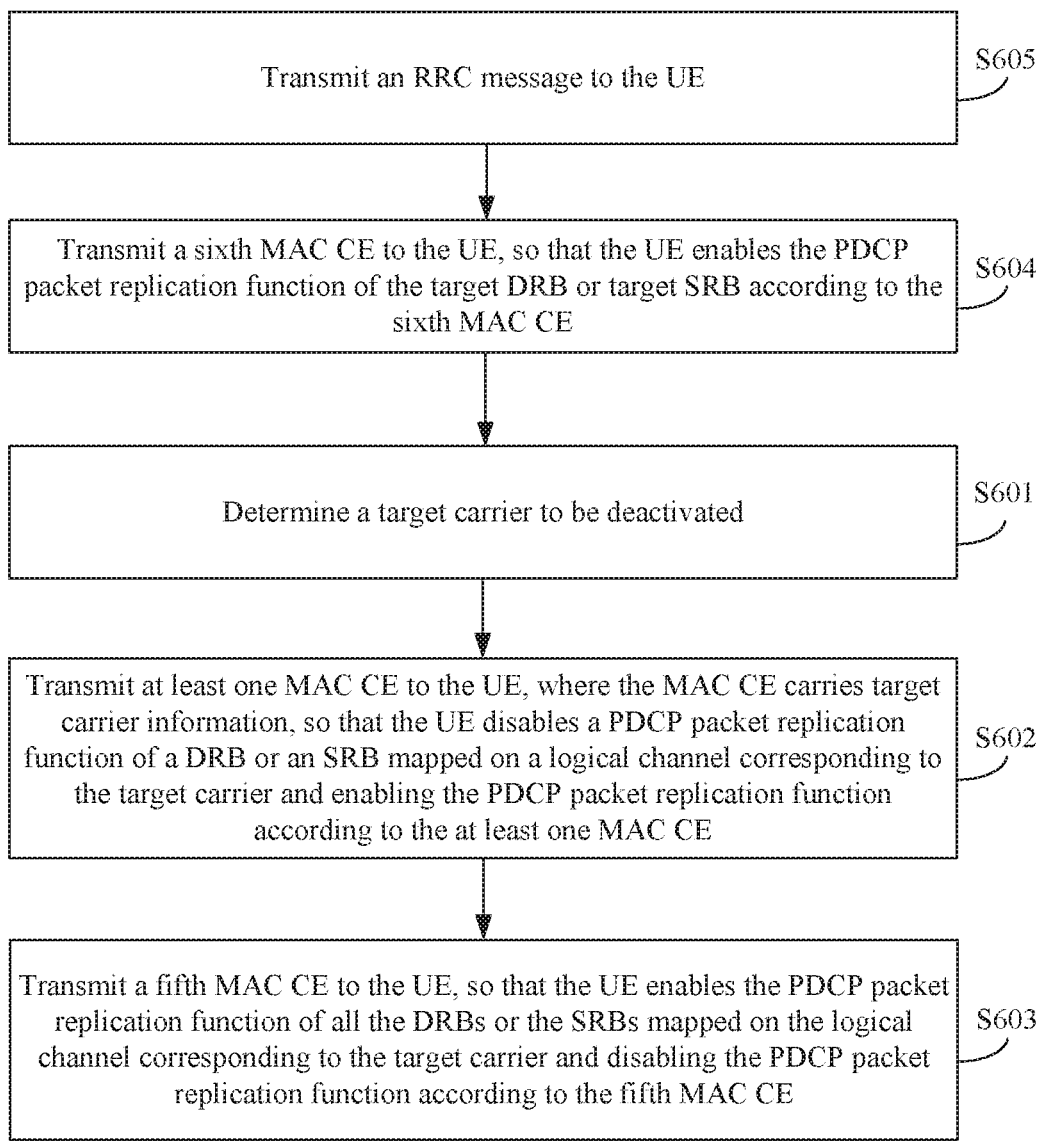
FIG. 6D is a flow chart illustrating another method for transmitting a MAC CE according to an exemplary embodiment of the present application.

FIG. 6D is a flow chart of another method for transmitting a MAC CE according to an exemplary embodiment of the present application, which is described from the base station side. As shown in FIG. 6D, before the step S604, the method for transmitting a MAC CE may further include the following steps.

In step S605, an RRC message is transmitted to the UE.

The RRC message carries configuration information, where the configuration information is used to configure a PDCP packet replication function of the target DRB or the target SRB and carrier information mapped by two logical channels corresponding to the target DRB or the target SRB, so that the UE sets the PDCP packet replication function of the target DRB or the target SRB to a disabled state according to the RRC message, and configures a mapping relationship between the two logical channels of the target DRB or the target SRB and the carrier.

In the above embodiment, by sending the RRC message to the UE, the UE may set the PDCP packet replication function of the target DRB or the target SRB to a disabled state according to the received RRC message, and configure a mapping relationship between two logical channels of the target DRB or the target SRB and the carrier, so as to provide a condition for subsequently enabling the PDCP packet replication function of the target DRB or the target SRB.

Figure 6E:
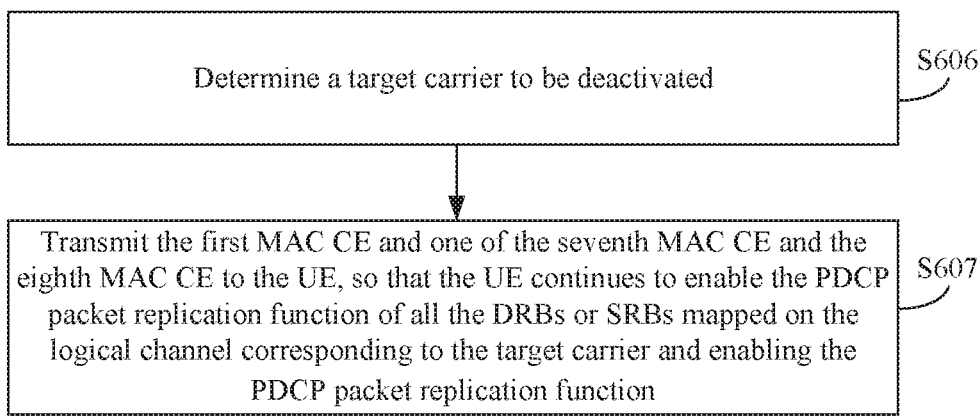
FIG. 6E is a flow chart illustrating yet another method for transmitting a MAC CE according to an exemplary embodiment of the present application.

FIG. 6E is a flow chart of yet another method for transmitting a MAC CE according to an exemplary embodiment of the present application, which is described from the base station side. As shown in FIG. 6E, the method for transmitting a MAC CE may include the following steps.

In step S606, a target carrier to be deactivated is determined.

In step S607, the first MAC CE and one of the seventh MAC CE and the eighth MAC CE are transmitted to the UE, so that the UE continues to enable the PDCP packet replication function of all the DRBs or SRBs mapped on the logical channel corresponding to the target carrier and enabling the PDCP packet replication function.

The first MAC CE is configured for indicating the UE to deactivate the target carrier, the seventh MAC CE is configured for indicating the UE to enable the PDCP packet replication function of the DRB or SRB mapped on the target carrier, and the eighth MAC CE is configured for indicating the UE to map a logical channel corresponding to the target carrier to a new carrier in an activated state.

The transmitting the first MAC CE and one of the seventh MAC CE and the eighth MAC CE to the UE may include: transmitting the first MAC CE and the seventh MAC CE to the UE, or transmitting the first MAC CE and the eighth MAC CE to the UE.

In addition, transmitting the first MAC CE and one of the seventh MAC CE and the eighth MAC CE to the UE may further include: When transmitting the first MAC CE and the eighth MAC CE to the UE, transmitting the second MAC CE to the UE. The number of the second MAC CEs is equal to the number of all the DRBs or SRBs mapped on the logical channel corresponding to the target carrier and enabling the PDCP packet replication function, and each second MAC CE is used for indicating to disable the PDCP packet replication function of one DRB or SRB.

In the above embodiment, by sending multiple types of MAC CEs to the UE, the UE can continue to enable the PDCP packet replication function of all the DRBs or SRB mapped on the logical channel corresponding to the target carrier and enabling the PDCP packet replication function, and the implementation manner is flexible and diverse.

Figure 6F:
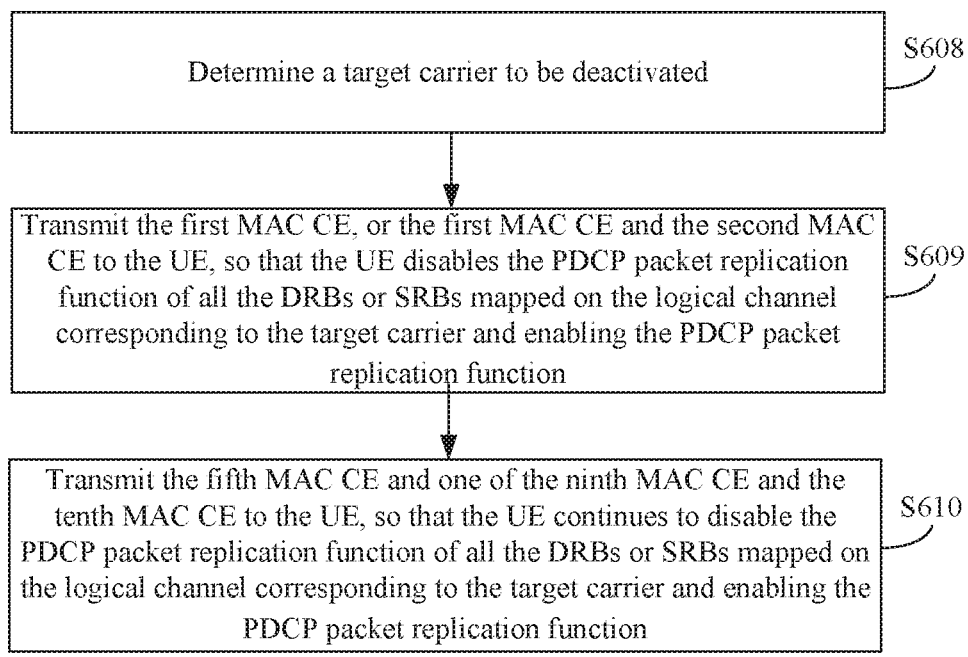
FIG. 6F is a flow chart illustrating yet another method for transmitting a MAC CE according to an exemplary embodiment of the present application.

FIG. 6F is a flow chart of still another method for transmitting a MAC CE according to an exemplary embodiment of the present application, which is described from the base station side. As shown in FIG. 6F, the method for transmitting a MAC CE may include the following steps.

In step S608, a target carrier to be deactivated is determined.

In step S609, the first MAC CE, or the first MAC CE and the second MAC CE, is transmitted to the UE, so that the UE disables the PDCP packet replication function of all the DRBs or SRBs mapped on the logical channel corresponding to the target carrier and enabling the PDCP packet replication function.

The first MAC CE is used for instructing the UE to deactivate the target carrier, the number of the second MAC CE is equal to the number of all the DRBs or SRBs which are mapped on the logical channel corresponding to the target carrier and enable the PDCP packet replication function, and each of the second MAC CEs is used for instructing to disable the PDCP packet replication function of one DRB or SRB.

In step S610, the fifth MAC CE and one of the ninth MAC CE and the tenth MAC CE are transmitted to the UE, so that the UE continues to disable the PDCP packet replication function of all the DRBs or SRBs mapped on the logical channel corresponding to the target carrier and enabling the PDCP packet replication function.

The fifth MAC CE is configured for indicating the UE to activate the target carrier, the ninth MAC CE is configured for indicating the UE to disable a PDCP packet replication function of the DRB or the SRB mapped on the target carrier, and the tenth MAC CE is configured for indicating the UE to map a logical channel corresponding to the target carrier to a new carrier in a deactivated state.

In the above embodiment, by sending multiple types of MAC CEs to the UE, the UE can continue to disable the PDCP packet replication function of all the DRBs or the SRBs mapped on the logical channel corresponding to the target carrier and enabling the PDCP packet replication function, and the implementation manner is flexible.

Figure 7A:
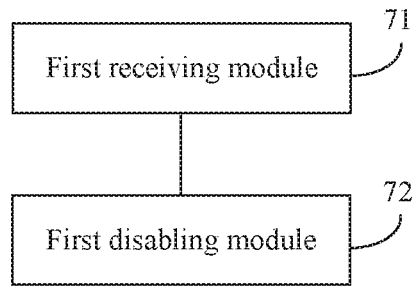
FIG. 7A is a block diagram illustrating an apparatus for disabling a PDCP packet replication function according to an exemplary embodiment.

FIG. 7A is a block diagram illustrating an apparatus for enabling and disabling a PDCP packet replication function according to an exemplary embodiment, and as shown in FIG. 7A, the apparatus for disabling a packet convergence protocol PDCP packet replication function includes: a first receiving module 71 and a first disabling module 72.

The first receiving module 71 is configured to receive at least one medium access control (MAC) control element (CE) transmitted by the base station, the MAC CE carrying target carrier information.

In an embodiment, the first receiving module 71 may be configured to receive a first MAC CE sent by the base station, where the first MAC CE is used for indicating the user equipment (UE) to deactivate the target carrier.

In another embodiment, the first receiving module 71 may be configured to receive a first MAC CE and a second MAC CE transmitted by the base station, the first MAC CE being used for indicating the UE to deactivate the target carrier, the number of the second MAC CEs being equal to the number of all DRBs or SRBs mapped on the logical channels corresponding to the target carrier and enabling the PDCP packet replication function, and each of the second MAC CEs being used for indicating to disable the PDCP packet replication function of one DRB or SRB.

In another embodiment, the first receiving module 71 may be configured to receive a first MAC CE, a third MAC CE and a fourth MAC CE transmitted by the base station, where the sum of the numbers of the third MAC CE and the fourth MAC CE is equal to the number of all DRBs or SRBs mapped on the logical channels corresponding to the target carrier and enabling the PDCP packet replication function, each third MAC CE is used to indicate to disable the PDCP packet replication function of one DRB or SRB, and each fourth MAC CE is used to indicate the carrier mapped by the logical channel of one DRB or SRB to be updated by the target carrier to a new carrier in an activated state.

The first disabling module 72 is configured to disable the PDCP packet replication function of the data bearer DRB or the signaling bearer SRB mapped on the logical channel corresponding to the target carrier and enabling the PDCP packet replication function according to the MAC CE received by the first receiving module 71.

In an embodiment, the first disabling module 72 may be configured to disable the PDCP packet replication function of all the DRBs or SRBs which are mapped on the logical channels corresponding to the target carrier and enabling the PDCP packet replication functions according to the first MAC CE.

In an embodiment, the first disabling module 72 may be configured to disable the PDCP packet replication function of all the DRBs or SRBs mapped on the logical channels corresponding to the target carriers and enabling the PDCP packet replication function according to the first MAC CE and the second MAC CE.

In an embodiment, the first disabling module 72 may be configured to disable the PDCP packet replication function of the DRB or SRB mapped on the logical channel corresponding to the target carrier, enabling the PDCP packet replication function, and having the same number as the third MAC CE according to the first MAC CE and the third MAC CE.

Assuming that the target carrier is a carrier 1, there are 10 DRBs for enabling the PDCP packet replication function corresponding to the carrier 1, and the UE receives 8 third MAC CEs and 2 fourth MAC CEs, then the UE disables the PDCP packet replication function of 8 DRBs, where the 8 disabled DRBs correspond to DRBs carried in the 8 third MAC CEs.

In the above embodiment, the PDCP packet replication function of the DRB or the SRB mapped on the logical channel corresponding to the target carrier and enabling the PDCP packet replication function may be disabled in various ways, and the implementation ways are flexible and diverse.

Figure 7B:
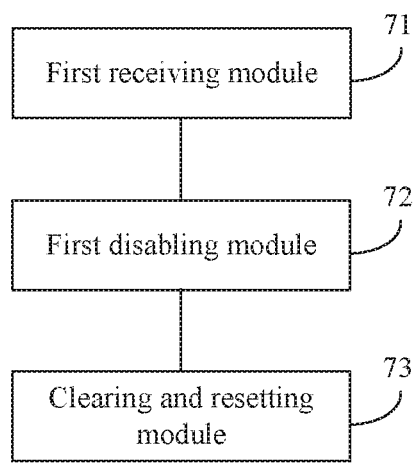
FIG. 7B is a block diagram illustrating another apparatus for disabling a PDCP packet replication function according to an exemplary embodiment.

FIG. 7B is a block diagram illustrating another apparatus for enabling and disabling a PDCP packet replication function according to an exemplary embodiment, and as shown in FIG. 7B, the apparatus may further include: a clearing and resetting module 73.

The clearing and resetting module 73 is configured to determine a radio link control (RLC) entity corresponding to the target carrier, clear all service data units (SDUs) and packet data units (PDUs) of the RLC entity to be transmitted, and reset a timer and a state variable corresponding to the RLC entity when the first disabling module 72 disables the PDCP packet replication function of all the DRBs or SRBs mapped on the logical channel corresponding to the target carrier and enabling the PDCP packet PDCP packet replication function replication function.

The state variable may include, but is not limited to, a state variable that maintains the position of the lower and upper boundaries of the transmission window.

In the above embodiment, when the PDCP packet replication function of all the DRBs or SRBs mapped on the logical channel corresponding to the target carrier and enabling the PDCP packet replication function is disabled, the SDU and PDU of the RLC entity corresponding to the target carrier are cleared, and the timer and state variable corresponding to the RLC entity are reset, so as to solve the problem that data cannot be transmitted after the target carrier is deactivated.

Figure 7C:
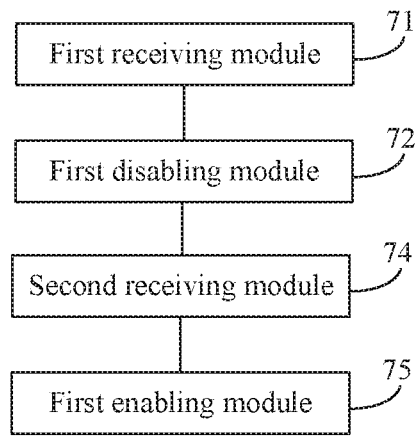
FIG. 7C is a block diagram illustrating another apparatus for disabling a PDCP packet replication function according to an exemplary embodiment.

FIG. 7C is a block diagram illustrating another apparatus for enabling and disabling a PDCP packet replication function according to an exemplary embodiment, and as shown in FIG. 7C, the apparatus may further include: a second receiving module 74 and a first enabling module 75.

The second receiving module 74 is configured to receive a fifth MAC CE transmitted by the base station after the first disabling module 72 disables the PDCP packet replication function of the DRB or SRB mapped on the logical channel corresponding to the target carrier and enabling the PDCP packet replication function, the fifth MAC CE being used for indicating the UE to activate the target carrier.

The first enabling module 75 is configured to enable the PDCP packet replication function of all the DRBs or SRBs which are mapped on the logical channel corresponding to the target carrier and disabling the PDCP packet replication function according to the fifth MAC CE received by the second receiving module 74.

In the above embodiment, by enabling the PDCP packet replication function of all the DRBs or SRBs mapped on the logical channel corresponding to the target carrier and disabling the PDCP packet replication function according to the received fifth MAC CE, the IE may enable the PDCP packet replication function mapped on the corresponding DRB or SRB after activating the target carrier, so that the data packet on the logical channel corresponding to the target carrier may be transmitted.

Figure 7D:
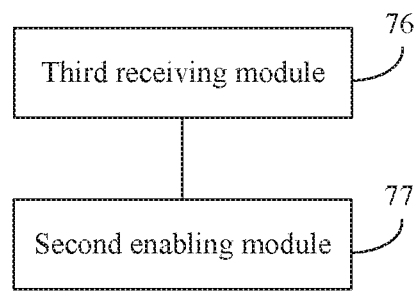
FIG. 7D is a block diagram illustrating another apparatus for disabling a PDCP packet replication function according to an exemplary embodiment.

FIG. 7D is a block diagram illustrating another apparatus for enabling and disabling a PDCP packet replication function according to an exemplary embodiment, and as shown in FIG. 7D, the apparatus may further include: a third receiving module 76 and a second enabling module 77.

The third receiving module 76 is configured to receive a sixth MAC CE transmitted by the base station before receiving the at least one MAC CE transmitted by the base station, where the sixth MAC CE is used for indicating the UE to enable the PDCP packet replication function of the target DRB or the target SRB.

The second enabling module 77 is configured to enable the PDCP packet replication function of the target DRB or the target SRB according to the sixth MAC CE received by the third receiving module 76.

In the above-described embodiment, by enabling the PDCP packet replication function of the target DRB or the target SRB according to the received sixth MAC CE, the PDCP packet and the PDCP replication packet can be transmitted through two logical channels.

Figure 7E:
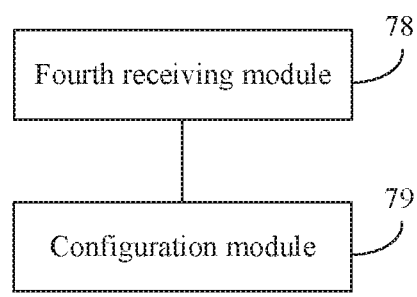
FIG. 7E is a block diagram illustrating another apparatus for disabling a PDCP packet replication function according to an exemplary embodiment.

FIG. 7E is a block diagram illustrating another apparatus for enabling and disabling a PDCP packet replication function according to an exemplary embodiment, and as shown in FIG. 7E, the apparatus may further include: a fourth receiving module 78 and a configuration module 79.

The fourth receiving module 78 is configured to receive an RRC message sent by the base station before the third receiving module 76 receives the sixth MAC CE sent by the base station, where the RRC message carries configuration information, the configuration information is used to configure the PDCP packet replication function of the target DRB or the target SRB, and carrier information mapped by two logical channels corresponding to the target DRB or the target SRB.

The configuration module 79 is configured to set the PDCP packet replication function of the target DRB or the target SRB to a disabled state and configure a mapping relationship between two logical channels of the target DRB or the target SRB and a carrier according to the RRC message received by the fourth receiving module 78.

In the above embodiment, the PDCP packet replication function of the target DRB or the target SRB is set to the disabled state according to the received RRC message, and the mapping relationship between the two logical channels of the target DRB or the target SRB and the carrier is configured, so as to provide conditions for subsequently enabling the PDCP packet replication function of the target DRB or the target SRB.

Figure 8A:
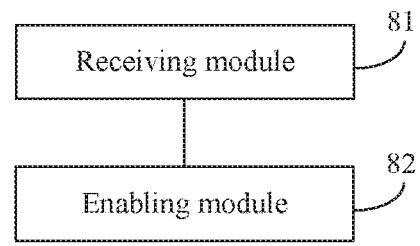
FIG. 8A is a block diagram illustrating an apparatus for enabling a PDCP packet replication function according to an exemplary embodiment.

FIG. 8A is a block diagram illustrating an apparatus for enabling a PDCP packet replication function according to an exemplary embodiment, and as shown in FIG. 8A, the apparatus includes: a receiving module 81 and an enabling module 82.

The receiving module 81 is configured to receive a first MAC CE and one of a seventh MAC CE and an eighth MAC CE transmitted by the base station, where the first MAC CE is used for indicating the UE to deactivate the target carrier, the seventh MAC CE is used for indicating the UE to enable a PDCP packet replication function of a DRB or an SRB mapped on the target carrier, and the eighth MAC CE is used for indicating the UE that a logical channel corresponding to the target carrier is mapped to a new carrier in an activated state.

In an embodiment, the receiving module 81 may be further configured to receive a second MAC CE transmitted by the base station when receiving the first MAC CE and the eighth MAC CE transmitted by the base station, where the number of the second MAC CEs is equal to the number of all DRBs or SRBs mapped on the logical channel corresponding to the target carrier and enabling the PDCP packet replication function, and each second MAC CE is used to indicate to disable the PDCP packet replication function of one DRB or SRB.

The enabling module 82 is configured to continue enabling the PDCP packet replication function of all the DRBs or SRBs mapped on the logical channel corresponding to the target carrier and enabling the PDCP packet replication function after the receiving module 81 receives the first MAC CE and one of the seventh MAC CE and the eighth MAC CE transmitted by the base station.

In the above embodiment, by receiving multiple types of MAC CEs, the PDCP packet replication function of the DRB or the SRB mapped on the logical channel corresponding to the target carrier and enabling the PDCP packet replication function may be continuously enabled, and the implementation manner is flexible and diverse.

Figure 8B:
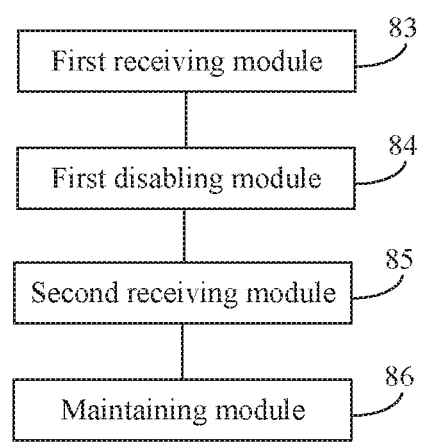
FIG. 8B is a block diagram illustrating still another apparatus for disabling a PDCP packet replication function according to an exemplary embodiment.

FIG. 8B is a block diagram illustrating still another apparatus for disabling a PDCP packet replication function according to an exemplary embodiment. As shown in FIG. 8B, the apparatus includes: a first receiving module 83, a first disabling module 84, a second receiving module 85 and a maintaining module 86.

The first receiving module 83 is configured to receive a first MAC CE, or the first MAC CE and a second MAC CE, sent by the base station, where the first MAC CE is used for indicating the UE to deactivate the target carrier; the number of the second MAC CEs is equal to the number of all the DRBs or SRBs mapped on the logical channel corresponding to the target carrier and enabling the PDCP packet replication function, and each second MAC CE is used for instructing to disable the PDCP packet replication function of one DRB or SRB.

The first disabling module 84 is configured to disable the PDCP packet replication function of all the DRBs or SRBs which are mapped on the logical channels corresponding to the target carriers and enable the PDCP packet replication function.

The second receiving module 85 is configured to receive a fifth MAC CE and one of a ninth MAC CE and a tenth MAC CE transmitted by the base station, the fifth MAC CE being configured for indicating the UE to activate the target carrier, the ninth MAC CE being configured for indicating the UE to disable the PDCP packet replication function of the DRB or the SRB mapped on the target carrier, and the tenth MAC CE being configured for indicating the UE to map a logical channel corresponding to the target carrier onto a new carrier in a deactivated state.

The maintaining module 86 is configured to continue to disable the PDCP packet replication function of all the DRBs or SRBs which are mapped on the logical channels corresponding to the target carriers and enable the PDCP packet replication function after the second receiving module 85 receives the fifth MAC CE and one of the ninth MAC CE and the tenth MAC CE.

In this embodiment, after the PDCP packet replication function of all the DRBs or SRBs mapped on the logical channel corresponding to the target carrier and enabling the PDCP packet replication function is disabled, if a fifth MAC CE activating the target carrier is received, while a ninth MAC CE disabling the PDCP packet replication function of the DRB or SRB mapped on the target carrier or a tenth MAC CE mapping the logical channel corresponding to the target carrier to a new carrier in a deactivated state is received, then the PDCP packet replication function of all the DRBs or SRBs mapped on the logical channel corresponding to the target carrier and enabling the PDCP packet replication function may be continuously disabled.

In the above embodiment, by receiving multiple types of MAC CEs, the PDCP packet replication function of all the DRBs or the SRBs mapped on the logical channel corresponding to the target carrier and enabling the PDCP packet replication function may be continuously disabled, and the implementation manner is flexible.

Figure 9A:
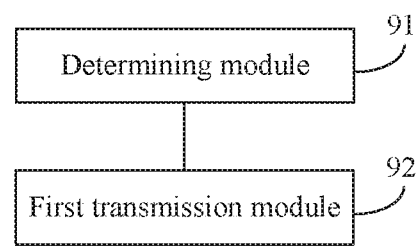
FIG. 9A is a block diagram illustrating an apparatus for transmitting a MAC CE according to an exemplary embodiment.

FIG. 9A is a block diagram illustrating an apparatus for transmitting a MAC CE according to an exemplary embodiment, and as illustrated in FIG. 9A, the apparatus for transmitting a MAC CE includes: a determining module 91 and a first transmitting module 92.

The determining module 91 is configured to determine a target carrier to be deactivated.

The first transmitting module 92 is configured to send at least one MAC CE to the UE, where the MAC CE carries the target carrier information of the target carrier determined by the determining module, so that the UE disables the PDCP packet replication function of the DRB or the SRB mapped on the logical channel corresponding to the target carrier and enabling the PDCP packet replication function according to the at least one MAC CE.

In an embodiment, the first transmitting module 92 may be configured to send, to the UE, a first MAC CE and a second MAC CE, the first MAC CE being used for indicating the UE to deactivate the target carrier, the number of the second MAC CEs being equal to the number of all DRBs or SRBs mapped on the logical channels corresponding to the target carrier and enabling the PDCP packet replication function, and each of the second MAC CEs being used for indicating to disable the PDCP packet replication function of one DRB or SRB, so that the UE disables the PDCP packet replication function of all the DRBs or SRBs which are mapped on the logical channels corresponding to the target carrier and enable the PDCP packet replication function according to the first MAC CE and the second MAC CE.

In another embodiment, the first transmitting module 92 may be configured to send the first MAC CE to the UE, send a third MAC CE and a fourth MAC CE to the UE, where the sum of the numbers of the third MAC CE and the fourth MAC CE is equal to the number of all the DRBs or SRBs mapped on the logical channel corresponding to the target carrier and enabling the PDCP packet replication function, each third MAC CE is used to indicate that the PDCP packet replication function of one DRB or SRB is disabled, and each fourth MAC CE is used to indicate that the carrier mapped by the logical channel of one DRB or SRB is updated by the target carrier to a new carrier in an activated state, so that the UE disables the PDCP packet replication function of the same number of DRBs or SRBs as the third MAC CE according to the first MAC CE and the third MAC CE.

In the above embodiment, by sending at least one MAC CE to the UE, the UE may disable the PDCP packet replication function of the DRB or the SRB mapped on the logical channel corresponding to the target carrier and enabling the PDCP packet replication function according to the at least one MAC CE, so as to solve the problem that the data packet on the logical channel corresponding to the deactivated target carrier cannot be sent.

Figure 9B:
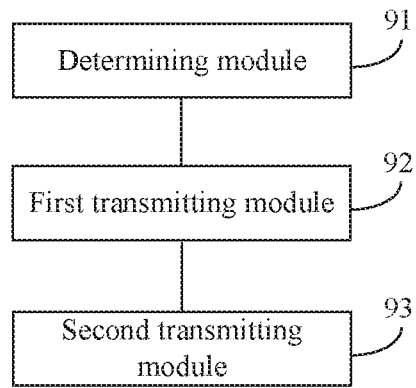
FIG. 9B is a block diagram illustrating another apparatus for transmitting a. MAC CE according to an exemplary embodiment.

FIG. 9B is a block diagram of another apparatus for transmitting a MAC CE according to an exemplary embodiment, and as shown in FIG. 9B, the apparatus may further include: a second transmitting module 93.

The second transmitting module 93 may be configured to transmit a fifth MAC CE to the UE after the first transmitting module 92 transmits the first MAC CE and the second MAC CE to the UE, the fifth MAC CE being used for indicating the UE to activate the target carrier, so that the UE enables the PDCP packet replication function of all the DRBs or SRBs which are mapped on the logical channels corresponding to the target carrier and disable the PDCP packet replication function according to the fifth MAC CE.

In the above embodiment, by sending the fifth MAC CE to the UE, the UE may enable the PDCP packet replication function of all the DRBs or the SRBs mapped on the logical channel corresponding to the target carrier and disabling the PDCP packet replication function according to the fifth MAC CE, so that the UE may send the data packet on the logical channel corresponding to the target carrier.

Figure 9C:
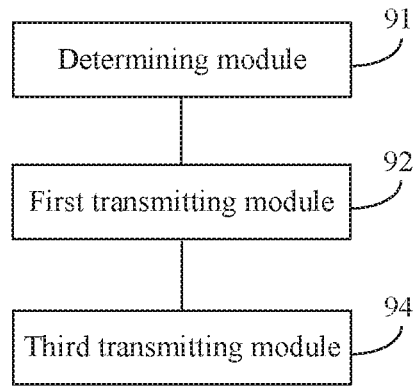
FIG. 9C is a block diagram illustrating another apparatus for transmitting a MAC CE according to an exemplary embodiment.

FIG. 9C is a block diagram of another apparatus for transmitting a MAC CE according to an exemplary embodiment, and as shown in FIG. 9C, the apparatus may further include: a third transmitting module 94.

The third transmitting module 94 is configured to send a sixth MAC CE to the UE before the first transmitting module 92 sends the at least one MAC CE to the UE, where the sixth MAC CE is configured for indicating the UE to enable the PDCP packet replication function of the target DRB or target SRB, so that the UE enables the PDCP packet replication function of the target DRB or target SRB according to the sixth MAC CE.

In the above embodiment, by sending the sixth MAC CE to the UE, the UE may enable the PDCP packet replication function of the target DRB or the target SRB according to the sixth MAC CE.

Figure 9D:
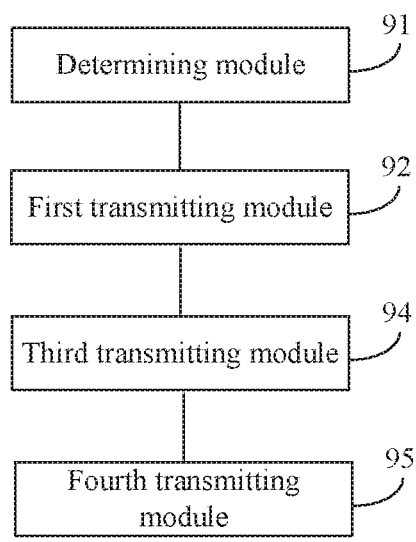
FIG. 9D is a block diagram illustrating another apparatus for transmitting a MAC CE according to an exemplary embodiment.

FIG. 9D is a block diagram of another apparatus for transmitting a MAC CE according to an exemplary embodiment, and as shown in FIG. 9D, the apparatus may further include: a fourth transmitting module 95.

The fourth transmitting module 95 is configured to send an RRC message to the UE before the third transmitting module 94 sends the sixth MAC CE to the UE, where the RRC message carries configuration information, and the configuration information is used to configure the PDCP packet replication function of the target DRB or the target SRB and carrier information mapped by two logical channels corresponding to the target DRB or the target SRB, so that the UE sets the PDCP packet replication function of the target DRB or the target SRB to a disabled state according to the RRC message, and configures a mapping relationship between the two logical channels of the target DRB or the target SRB and the carrier.

In the above embodiment, by sending an RRC message to the UE, the UE may set the PDCP packet replication function of the target DRB or the target SRB to a disabled state according to the received RRC message, and configure a mapping relationship between two logical channels of the target DRB or the target SRB and a carrier, so as to provide a condition for subsequently enabling the PDCP packet replication function of the target DRB or the target SRB.

Figure 10:
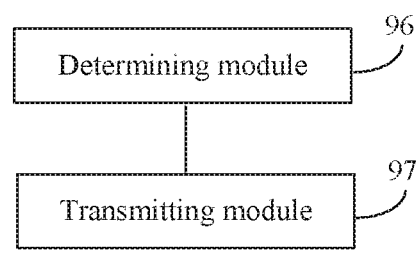
FIG. 10 is a block diagram illustrating yet another apparatus for transmitting a MAC CE according to an exemplary embodiment.

FIG. 10 is a block diagram illustrating still another apparatus for transmitting a MAC CE according to an exemplary embodiment, and as shown in FIG. 10, the apparatus includes: a determining module 96 and a transmitting module 97.

The determining module 96 is configured to determine the target carrier to be deactivated.

The transmitting module 97 is configured to send, to the UE, a first MAC CE and one of a seventh MAC CE and an eighth MAC CE, the first MAC CE being used for instructing the UE to deactivate the target carrier determined by the determining module 96, the seventh MAC CE being used for instructing the UE to enable a PDCP packet replication function of a DRB or an SRB mapped on the target carrier, and the eighth MAC CE being for instructing the UE that a logical channel corresponding to the target carrier is mapped to a new carrier in an activated state, so that the UE continues to enable the PDCP packet replication function of all the DRBs or SRBs mapped on the logical channel corresponding to the target carrier and enabling the PDCP packet replication function.

In an embodiment, the transmitting module 97 may be further configured to: when the first MAC CE and the eighth MAC CE are transmitted to the UE, transmitting the second MAC CEs to the UE, the number of the second MAC CEs is equal to the number of all the DRBs or SRBs which are mapped on the logical channel corresponding to the target carrier and enable the PDCP packet replication function, and each second MAC CE is used for indicating to disable the PDCP packet replication function of one DRB or SRB.

In the above embodiment, by receiving multiple types of MAC CEs, the PDCP packet replication function of all the DRBs or the SRBs mapped on the logical channel corresponding to the target carrier and enabling the PDCP packet replication function may be continuously disabled, and the implementation manner is flexible and diversity.

Figure 11:
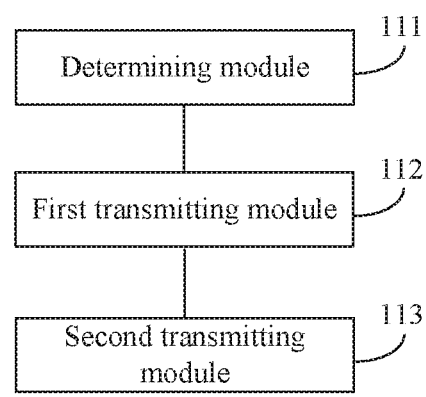
FIG. 11 is a block diagram illustrating yet another apparatus for transmitting a MAC CE according to an exemplary embodiment.

FIG. 11 is a block diagram illustrating still another apparatus for transmitting a MAC CE according to an exemplary embodiment, and as illustrated in FIG. 11, the apparatus includes: a determining module 111, a first transmitting module 112 and a second transmitting module 113.

The determining module 111 is configured to determine a target carrier to be deactivated.

The first transmitting module 112 is configured to send, to the UE, a first MAC CE, or a first MAC CE and a second MAC CE, the first MAC CE being used for indicating the UE to deactivate the target carrier determined by the determining module 111, the number of the second MAC CEs being equal to the number of all the DRBs or SRBs mapped on the logical channel corresponding to the target carrier and enabling the PDCP packet replication function, each of the second MAC CEs being used for indicating to disable the PDCP packet replication function of one DRB or SRB, so that the UE disables the PDCP packet replication function of all the DRBs or SRBs which are mapped on the logical channel corresponding to the target carrier and enable the PDCP packet replication function.

The second transmitting module 113 is configured to transmit a fifth MAC CE and one of a ninth MAC CE and a tenth MAC CE, the fifth MAC CE being used for instructing the UE to activate the target carrier, the ninth MAC CE being used for instructing the UE to disable the PDCP packet replication function of the DRB or the SRB mapped on the target carrier, and the tenth MAC CE being used for instructing the UE to map the logical channel corresponding to the target carrier to the new carrier in the deactivated state, so that the UE continues to disable the PDCP packet replication function of all the DRBs or the SRBs mapped on the logical channel corresponding to the target carrier and enabling the PDCP packet replication function.

In the above embodiment, by receiving multiple types of MAC CEs, the PDCP packet replication function of all the DRBs or the SRBs mapped on the logical channel corresponding to the target carrier and enabling the PDCP packet replication function may be continuously disabled, and the implementation manner is flexible.

Figure 12:
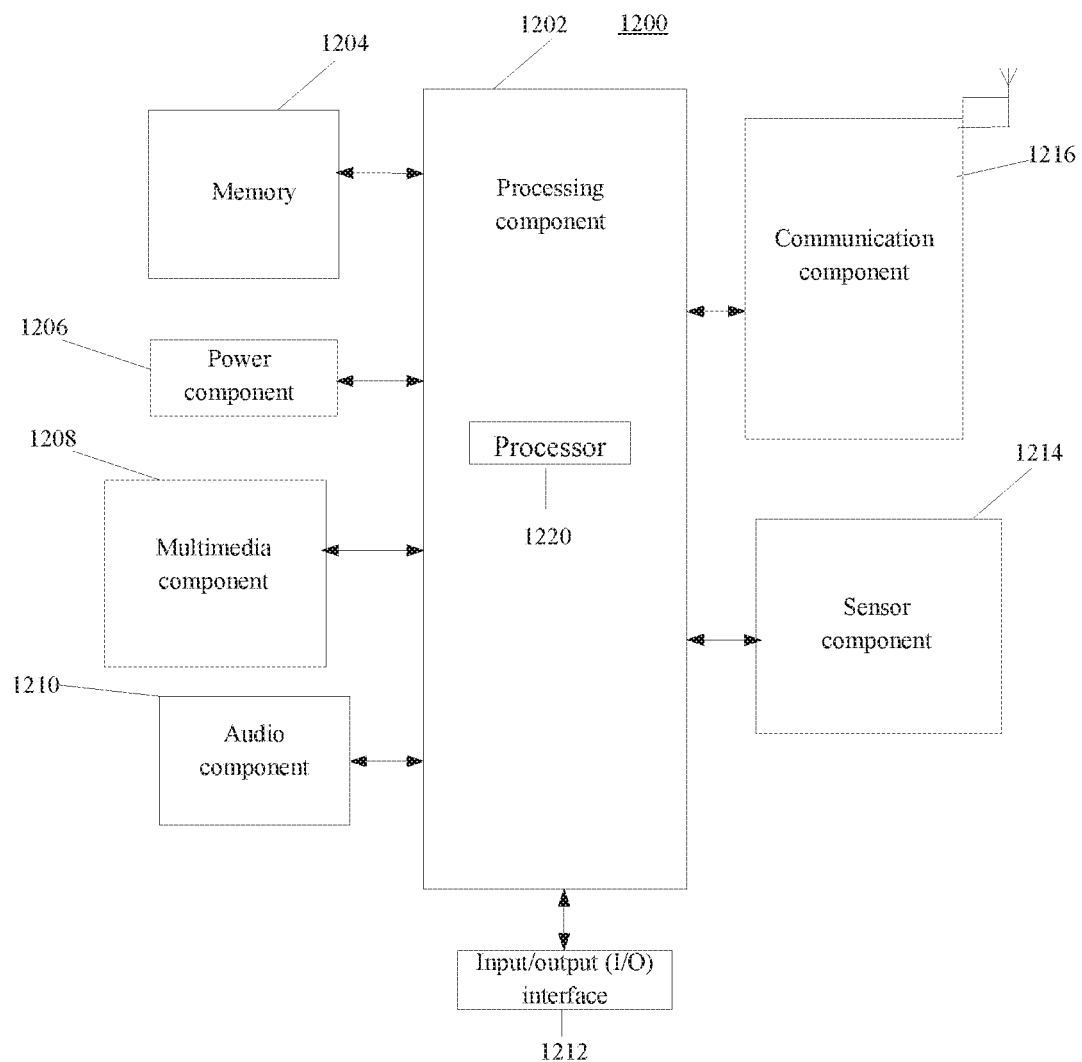
FIG. 12 is a block diagram illustrating an apparatus for disabling or enabling a PDCP packet replication function according to an exemplary embodiment.

FIG. 12 is a block diagram illustrating an apparatus for disabling or enabling a PDCP packet replication function according to an exemplary embodiment. For example, the apparatus 1200 may be a mobile phone, a computer, a digital broadcast terminal, a messaging device, a gaming console, a tablet, a medical device, exercise equipment, a personal digital assistant, and other user devices.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a. Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the apparatus 1200, for performing the above-described methods. For example, the non-transitory computer-readable storage medium may be a ROM, a RAM, a CD-ROM, a magnetic tape, a floppy disc, an optical data storage device, and the like.

Figure 13:
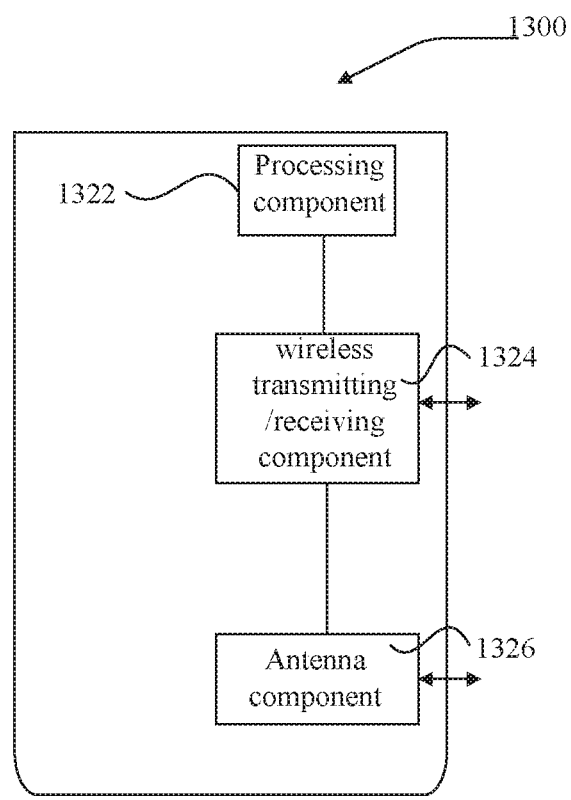
FIG. 13 is a block diagram illustrating an apparatus adapted to transmit MAC CE according to an exemplary embodiment.

FIG. 13 is a block diagram illustrating another apparatus for disabling or enabling a PDCP packet replication function according to an exemplary embodiment. The apparatus 1300 may be provided as a base station. Referring to FIG. 13, the apparatus 1300 includes a processing component 1322, which may further include one or more processors, a wireless transmitting/receiving component 1324, an antenna component 1326, and a signal processing portion that is specific to a wireless interface.

One of the processors in the processing component 1322 may be configured to:

determine a target carrier to be deactivated; and transmit at least one MAC CE to UE, where the MAC CE carries target carrier information for the UE to disabling a PDCP packet replication function of a DRB or an SRB which is mapped on a logical channel corresponding to the target carrier and enables the PDCP packet replication function according to the at least one MAC CE.

One of the processors in the processing component 1322 may also be configured to:

determine a target carrier to be deactivated; and transmit a first MAC CE and one of a seventh MAC CE and an eighth MAC CE to the UE, where the first MAC CE is used for indicating the UE to deactivate a target carrier, the seventh MAC CE is used for indicating the UE to enable a PDCP packet replication function of a DRB or an SRB mapped on the target carrier, and the eighth MAC CE is used for indicating the UE to map a logical channel corresponding to the target carrier on a new carrier in an activated state, so that the UE continues to enable the PDCP packet replication function of all the DRBs or SRBs which are mapped on the logical channel corresponding to the target carrier and enable the PDCP packet replication function.

One of the processors in the processing component 1322 may also be configured to:

receive a first MAC CE, or the first MAC CE and a second MAC CE, that are transmitted by a base station, wherein the first MAC CE is used for indicating UE to deactivate a target carrier a number of the second MAC CE is equal to a number of all DRBs or SRBs which are mapped on a logical channel corresponding to the target carrier and enable the PDCP packet replication function, and each second MAC CE is used for indicating to disable the PDCP packet replication function of one DRB or SRB;

disable the PDCP packet replication function of all DRBs or SRBs which are mapped on the logical channel corresponding to the target carrier and enable the PDCP packet replication function;

receive a fifth MAC CE and one of a ninth MAC CE and a tenth MAC CE transmitted by the base station, wherein the fifth MAC CE is used for indicating the UE to activate the target carrier, the ninth MAC CE is used for indicating the UE to disable the PDCP packet replication function of the DRB or SRB mapped on the target carrier, and the tenth MAC CE is used for indicating the UE that the logical channel corresponding to the target carrier is mapped to a new carrier in a deactivated state; and continue to disable the PDCP packet replication function of all DRBs or SRBs which are mapped on the logical channel corresponding to the target carrier and enable the PDCP packet replication function.

For the apparatus embodiments, since they substantially correspond to the method embodiments, reference is made to the partial description of the method embodiments for the relevant point. The above-described apparatus embodiments are merely illustrative, where the units described as separate components may or may not be physically separate, and the components shown as units may or may not be physical units, i.e. may be located in one place, or may be distributed over a plurality of network elements. Some or all of the modules may be selected according to actual needs to achieve the purpose of the schemes of the embodiments. Those skilled in the art will understand and practice the present disclosure without the inventive labor.

It should be noted that relational terms such as first and second, and the like may be used herein to distinguish one entity or action from another entity or action without necessarily requiring or implying any actual such relationship or order between such entities or actions. The terms "include", "comprise" or any other variation thereof, are intended to cover a non-exclusive inclusion, such that a process, method, article, or device that includes a series of elements, does not include only those elements but may include other elements not expressly listed or inherent to such process, method, article, or apparatus. Without further limitation, the elements defined by the phrase "including a/an . . . " do not exclude the presence of additional elements in the process, method, article, or apparatus that includes the element.

The method and apparatus provided by the embodiments of the present disclosure are described in detail above, and the principle and implementation of the present disclosure are described herein by using specific examples, which are only used to help understand the method and core idea of the present disclosure. In addition, for the person skilled in the art, the embodiments and the application range may be changed based on the idea of the present disclosure. From above, the contents of the description should not be understood to limit the present disclosure.

What is claimed is:

1. A method for disabling a Packet Data Convergence Protocol (PDCP) packet replication function, comprising:
    receiving at least one Media Access Control (MAC) Control Element (CE) transmitted by a base station, wherein the at least one MAC CE carries target carrier information; and
    disabling, according to the MAC CE, a PDCP packet replication function of at least one of a Data Radio Bearing (DRB) or a Signaling Radio Bearing (SRB), the at least one of the DRB or the SRB being mapped on a logical channel corresponding to a target carrier and having the PDCP packet replication function enabled,
    wherein the receiving at least one MAC CE transmitted by the base station comprises:
        receiving a first MAC CE and a second MAC CE transmitted by the base station, wherein the first MAC CE is configured to indicate User Equipment (UE) to deactivate the target carrier, and wherein a number of the second MAC CE is equal to a number of all DRBs or SRBs which are mapped on the logical channel corresponding to the target carrier and have the PDCP packet replication function enabled, and each second MAC CE is configured to indicate disabling the PDCP packet replication function of one DRB or SRB, and
    wherein the disabling the PDCP packet replication function of the at least one of the DRB or the SRB comprises:
        disabling, according to the first MAC CE and the second MAC CE, the PDCP packet replication function of all the DRBs or the SRBs which are mapped on the logical channel corresponding to the target carrier and have the PDCP packet replication function enabled.

2. The method of claim 1, further comprising:
    when disabling the PDCP packet replication function of all the DRBs or the SRBs which are mapped on the logical channel corresponding to the target carrier and have the PDCP packet replication function enabled, determining a Radio Link Control (RLC) entity corresponding to the target carrier, clearing all Service Data Units (SDUs) and Packet Data Units (PDUs) of the RLC entity to be transmitted, and resetting a timer and a state variable corresponding to the RLC entity.

3. The method of claim 1, further comprising:
    after disabling the PDCP packet replication function of the at least one of the DRB or the SRB, receiving a third MAC CE transmitted by the base station, the third MAC CE being configured to indicate the UE to activate the target carrier; and
    enabling, according to the third MAC CE, the PDCP packet replication function of all the DRBs or the SRBs which are mapped on the logical channel corresponding to the target carrier and have the PDCP packet replication function disabled.

4. The method of claim 1, further comprising:
    before receiving the at least one MAC CE transmitted by the base station, receiving a third MAC CE transmitted by the base station, wherein the third MAC CE is configured to indicate the UE to enable the PDCP packet replication function of a target DRB or a target SRB; and
    enabling the PDCP packet replication function of the target DRB or the target SRB according to the third MAC CE.

5. A method for transmitting a Media Access Control (MAC) Control Element (CE), comprising:
    determining a target carrier to be deactivated; and
    transmitting at least one MAC CE to User Equipment (UE), wherein the at least one MAC CE carries target carrier information so that the UE disables, according to the at least one MAC CE, a PDCP packet replication function of at least one of a Data Radio Bearing (DRB) or a Signaling Radio Bearing (SRB), the at least one of the DRB or the SRB being mapped on a logical channel corresponding to the target carrier and having the PDCP packet replication function enabled,
    wherein the transmitting the at least one MAC CE to the UE comprises:
        transmitting a first MAC CE and a second MAC CE to the UE,
    wherein the first MAC CE is configured to indicate the UE to deactivate the target carrier, a number of the second MAC CE is equal to a number of all DRBs or SRBs which are mapped on the logical channel corresponding to the target carrier and have the PDCP packet replication function enabled, and
    each second MAC CE is configured to indicate disabling the PDCP packet replication function of one DRB or SRB, so that the UE disables, according to the first MAC CE and the second MAC CE, the PDCP packet replication function of all the DRBs or the SRBs which are mapped on the logical channel corresponding to the target carrier and have the PDCP packet replication function enabled.

6. The method of claim 5, wherein the transmitting at least one MAC CE to the UE comprises:

transmitting a third MAC CE and a fourth MAC CE to the UE, wherein a sum of a number of the third MAC CE and a number of the fourth MAC CE is equal to a number of all the DRBs or the SRBs which are mapped on the logical channel corresponding to the target carrier and have the PDCP packet replication function enabled, and each third MAC CE is configured to indicate disabling the PDCP packet replication function of one DRB or SRB, and each fourth MAC CE is configured to indicate updating a carrier mapped by the logical channel of one DRB or SRB from the target carrier to a new carrier in an activated state, so that the UE disables, according to the first MAC CE and the third MAC CE, the PDCP packet replication function of a same number of DRBs or SRBs as the third MAC CE.

7. The method of claim 5, further comprising:

after transmitting the first MAC CE and the second MAC CE to the UE, transmitting a fifth MAC CE to the UE, wherein the fifth MAC CE is configured to indicate the UE to activate the target carrier, so that the UE enables, according to the fifth MAC CE, the PDCP packet replication function of all the DRBs or the SRBs which are mapped on the logical channel corresponding to the target carrier and have the PDCP packet replication function disabled.

8. The method of claim 5, further comprising:

before transmitting the at least one MAC CE to the UE, transmitting a sixth MAC CE to the UE, wherein the sixth MAC CE is configured to indicate the UE to enable the PDCP packet replication function of a target DRB or a target SRB, so that the UE enables the PDCP packet replication function of the target DRB or the target SRB according to the sixth MAC CE.

9. The method of claim 8, further comprising:

before transmitting the sixth MAC CE to the UE, transmitting a Radio Resource Control (RRC) message to the UE, wherein the RRC message carries configuration information, the configuration information configures the PDCP packet replication function of the target DRB or the target SRB and carrier information mapped by two logical channels corresponding to the target DRB or the target SRB, so that the UE sets the PDCP packet replication function of the target DRB or the target SRB to a disabled state according to the RRC message, and configures a mapping relationship between two logical channels of the target DRB or the target SRB and a carrier.

10. A method for transmitting a Media Access Control (MAC) Control Element (CE), comprising:

determining a target carrier to be deactivated;

transmitting a first MAC CE, or a first MAC CE and a second MAC CE, to User Equipment (UE), wherein the first MAC CE is configured to indicate the UE to deactivate a target carrier, a number of the second MAC CE is equal to a number of all DRBs or SRBs which are mapped on a logical channel corresponding to the target carrier and have a PDCP packet replication function enabled, and each second MAC CE is configured to indicate disabling the PDCP packet replication function of one DRB or SRB, so that the UE disables the PDCP packet replication function of all the DRBs or the SRBs which are mapped on the logical channel corresponding to the target carrier and have the PDCP packet replication function enabled; and transmitting a third MAC CE and one of a fourth MAC CE and a fifth MAC CE to the UE, wherein the third MAC CE is configured to indicate the UE to activate the target carrier, the fourth MAC CE is configured to indicate the UE to disable the PDCP packet replication function of the DRB or the SRB mapped on the target carrier, and the fifth MAC CE is configured to indicate the UE to map the logical channel corresponding to the target carrier to a new carrier in a deactivated state, so that the UE continues to disable the PDCP packet replication function of all the DRBs or the SRBs which are mapped on the logical channel corresponding to the target carrier and have the PDCP packet replication function enabled.

\* \* \* \* \*